(12) United States Patent
Takeda

(10) Patent No.: US 6,894,825 B2
(45) Date of Patent: May 17, 2005

(54) PROCESS FOR PRODUCING DISPLAY DEVICE

(75) Inventor: Toshihiko Takeda, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 13 days.

(21) Appl. No.: 10/691,154

(22) Filed: Oct. 21, 2003

(65) Prior Publication Data

US 2004/0135764 A1 Jul. 15, 2004

(30) Foreign Application Priority Data

Oct. 21, 2002 (JP) .......................................... 2002-305681
Oct. 21, 2002 (JP) .......................................... 2002-305682

(51) Int. Cl.⁷ .............................................. G02F 1/19
(52) U.S. Cl. ....................................... 359/296; 359/321
(58) Field of Search ................................ 359/296, 321, 359/240, 241; 345/107; 349/74, 73, 84, 93

(56) References Cited

U.S. PATENT DOCUMENTS 5,986,729 A    11/1999  Yamanaka et al. ............. 349/79
6,563,557 B2 *  5/2003  Yamanaka et al. ............ 349/74
2002/0008898 A1  1/2002  Katase ........................ 359/296
2002/0018043 A1 *  2/2002  Nakanishi .................... 345/107

FOREIGN PATENT DOCUMENTS

WO   WO 02/01281 A2    1/2002

OTHER PUBLICATIONS

A copy of an International Search Report mailed Jan. 27, 2004, in PCT application No. PCT/JP03/13375.

* cited by examiner

Primary Examiner—Scott J. Sugarman
Assistant Examiner—Richard Hanig
(74) Attorney, Agent, or Firm—Morgan & Finnegan, LLP

(57) ABSTRACT

An electric display device of the type wherein a dispersion liquid comprising at least a dispersion medium and electrophoretic particles is disposed in a space defined by a substrate, a partition wall disposed on the substrate, and a sealing film disposed on an upper end portion of the partition wall is produced through a process including a step of disposing a sealing film precursor, comprising a polymerizable compound, supported by a supporting member on both an exposed surface of the dispersion liquid and at least a part of the upper end portion of the partition wall in a state that the dispersion liquid is filled between adjacent partition walls, and a step of polymerizing the polymerizable compound to form the sealing film.

19 Claims, 10 Drawing Sheets

PROCESS FOR PRODUCING DISPLAY DEVICE

FIELD OF THE INVENTION AND RELATED ART

The present invention relates to a process for producing an electric display device which reflects a distribution state of a group of electrophoretic particles in a display state.

When charged electrophoretic particles is supplied with an electric field in an insulating liquid, the electrophoretic particles undergo displacement under the action of electrophoresis. In recent years, an electrophoretic display (EPD) utilizing this electrophoresis phenomenon has been extensively developed. Compared with a liquid crystal display device, the EPD has advantageous features, such as a high display contrast, no viewing angle dependence, a display state memory characteristic, a flexible device structure, and no need of a backlight or a polarizer.

As described above, the electrophoretic particles are dispersed in the liquid, so that the electrophoretic particles are readily displaced in a substrate surface direction by diffusion etc. This displacement induces a deterioration in display image, so that it is necessary to restrict a movable area of the fine particles (electrophoretic particles). One of methods of restricting the movable area of the fine particles is that a plurality of minute hollow spaces are formed on a substrate for device and the electrophoretic particles and the insulating liquid are confined. If this confinement is completely performed, it is possible to restrict he particle displacement area to the minute hollow spaces in which the electrophoretic particles are confined.

Such a process wherein a state of confinement of electrophoretic particles, insulating liquid, etc., is created in hollow spaces has been proposed in Japanese Laid-Open Patent Application No. 2000-342672 (e.g., FIG. 26). According to the particle confinement method of this JP publication (before examination), at first, a partition wall is formed on a substrate so as to define a plurality of cells. In each of the defined cells, a mixture (dispersion system) comprising electrophoretic particles are liquid is filled by an ink jet method. On the dispersion system, a sealing material is applied and cured to crate a state wherein the dispersion system is confined. Thereafter the cured sealing material disposed on the substrate provided with the partition wall and an opposite substrate are bonded to each other to complete a display device.

Further, the JP publication also discloses a process wherein a mixture of the dispersion system and the sealing material is filled in the respective cells by the ink jet method. In this case, if the sealing material has a specific gravity smaller than that of the dispersion system and they are not soluble in each other the sealing material and the dispersion system are (phase-)separated from each other. As a result, a state in which the sealing material is disposed on the dispersion system is finally created. In such a state, the sealing material is cured to form a state that the dispersion system is confined. Thereafter, the cured sealing material disposed on the partition wall-formed substrate and an opposite substrate ar bonded to each other to complete a display device.

However, the production process of the JP publication (JP2000-343672) has been accompanied with a possibility that the following problems are caused to arise.

First, there is a problem such that it is difficult to use ultraviolet (UV) polymerizable materials represented by (meth-)acrylate type monomers. These materials are usable as a starting material for a soft sealing film required to make a resultant display device flexible. Further, these materials are inexpensive, thus reducing costs of the display device. The above UV polymerizable materials are ordinarily polymerized through radical polymerization which is inhibited by oxygen. Accordingly, in the case where the polymerization of the sealing material is performed in a state in which the sealing material is exposed to ambient air as in the JP publication, it is difficult to use the UV polymerizable materials. If the materials are used, a particular curing apparatus for removing oxygen from a polymerization environment is required.

Secondly, there is a problem such that the sealing material is limited in specific gravity, thus narrowing the scope of selection of materials for the sealing film. In the JP publication, the specific gravity of the sealing material is required to be smaller than that of the dispersion system. For example, if a solvent of isoparaffin type which is frequently used as a dispersion medium, the specific gravity of the sealing material is required to be less than 1. However, most of curable materials have specific gravities larger than 1. For this reason, the scope of selection of the materials becomes small.

Thirdly, there is a problem such that it is difficult to dispose the sealing material uniformly over a wide area. This is attributable to an occurrence of ununiformity of the sealing material layer which is exposed to ambient air. One of the reasons for causing the ununiformity is a droplet (formation) phenomenon of the sealing material. It is generally difficult to obviate the occurrence of ununiformity. Further, the occurrence of ununiformity becomes more noticeable in a larger-sized device.

SUMMARY OF THE INVENTION

An object of the present invention is to provide a process for producing an electric display device having solved the above-mentioned problems.

A specific object of the present invention is to provide a process for producing an electric display device capable of forming inexpensive and soft sealing film without being restricted in specific gravity of a polymerizable compound by using a UV polymerizable compound polymerized through radial polymerization as a starting material for the sealing film.

According to a first aspect of the present invention, there is provided a process for producing an electric display device of the type wherein a dispersion liquid comprising at least a dispersion medium and electrophoretic particles is disposed in a space defined by a substrate, a partition wall disposed on the substrate, and a sealing film disposed on an upper end portion of the partition wall, the process comprising:

a step of disposing a sealing film precursor, comprising a polymerizable compound, supported by a supporting member on both an exposed surface of the dispersion liquid and at least a part of the upper end portion of the partition wall in a state that the dispersion liquid is filled between adjacent partition walls, and a step of polymerizing the polymerizable compound to form the sealing film.

According to a second aspect of the present invention is to provide a process for producing an electric display device of the type wherein a dispersion liquid comprising at least a dispersion medium and electrophoretic particles is disposed in a space defined by a substrate, a partition wall disposed on the substrate, and provided with a bonding film at an upper end portion thereof and a sealing film disposed on the upper end portion of the partition wall, the process comprising:

a step of disposing a bonding film precursor, comprising a polymerizable compound, on the upper end portion of the partition wall, a step of disposing a sealing film precursor, comprising a polymerizable compound, on both an exposed surface of the dispersion liquid and at least the surface of the bonding film at the upper end portion of the partition wall, and a step of polymerizing the polymerizable compound in a state that the bonding film precursor contacts the sealing film precursor to integrally form the sealing film and the bonding film.

By using the production processes according to the present invention, it is possible to provide an electric display device having inexpensive and flexible sealing film irrespective of the specific gravity of the polymerizable compound. Further, it is also possible to ensure a good adhesive properties between the sealing film and the partition wall.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Figure 1:
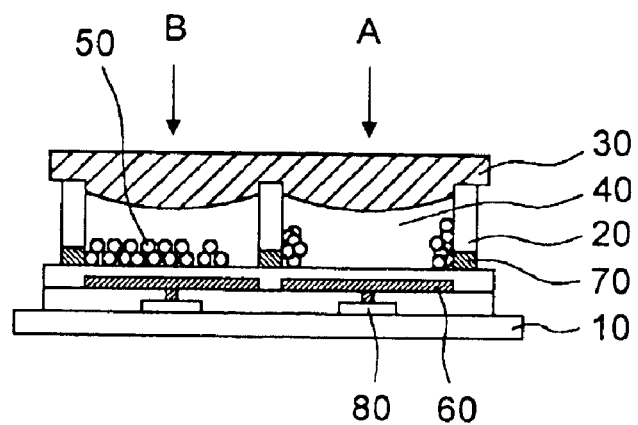
FIG. 1 is a schematic sectional view illustrating an embodiment of an electric display device produced by the process of the present invention.

Hereinbelow, the production process of electric display device according to the present invention will be described more specifically.

The production process according to the first aspect of the present invention may include:

a process for producing an electric display device of the type wherein a dispersion liquid comprising at least a dispersion medium and electrophoretic particles is disposed in a space defined by a substrate, a partition wall disposed on the substrate, and a sealing film disposed on an upper end portion of the partition wall wherein the sealing film is formed through polymerization of a polymerizable compound in such state that the dispersion liquid is filled between adjacent partition walls, that a sealing film precursor, comprising the polymerizable compound, contacts both an exposed surface of the dispersion liquid and at least a part of the upper end portion of the partition wall, and that the sealing film precursor is supported by a planar sealing member.

The production process according to the first aspect of the present invention may include the following specific embodiments (a) to (l):

(a) the supporting member has a surface which has an affinity to the sealing film precursor, (b) the dispersion liquid and the sealing film precursor are insoluble in each other, (c) the polymerizable compound is a photopolymerizable compound;

(d) the photopolymerizable compound comprises a photopolymerizable monomer or oligomer;

(e) the photopolymerizable monomer is 1,4-butanedioldiglycidyl ether diacrylate;

(f) the photopolymerizable oligomer is polytetramethylene ether glycol=di(2-maleimide acetate), (g) the photopolymerizable monomer is fluorine-containing acrylate, (h) the photopolymerizable monomer or oligomer comprises at least two species of monomers or oligomers, at least one of which is a fluorine-containing acrylate, (i) the photopolymerizable monomer or oligomer comprises at least two species of monomers or oligomers at least one of which is polytetramethylene ether glycol=di(2-maleimide acetate), (j) the supporting member is removed from the sealing film after completion of the polymerization, (k) on the sealing film, another film is disposed after the supporting member is removed, and (l) the supporting member and the sealing film are transparent.

The production process according to the second aspect of the present invention may includes a process for producing an electric display device of the type wherein a dispersion liquid comprising at least a dispersion medium and electrophoretic particles is disposed in a space defined by a substrate, a partition wall disposed on the substrate, and provided with a bonding film at an upper end portion thereof and a sealing film disposed on the upper end portion of the partition wall; wherein the sealing film is formed through polymerization of a sealing film precursor comprising a polymerizable compound and a bonding film precursor, comprising a polymerizable compound; a layer of the bonding film precursor is disposed on at least the upper end portion of the partition wall; and the polymerization is performed in a state that a layer of the sealing film precursor contacts on both an exposed surface of the dispersion liquid, filled between adjacent partition walls, and at least the layer of the being film precursor.

The production process according to the second aspect of the present invention may include the following specific embodiments (a) to (t):

(a) the polymerizable compound has at least one group selected from the group consisting of —O—, —CH$_2$—O—, —OH, and —CF$_2$—;

(b) the polymerizable compound has a polyethylene glycol structure, (c) the polymerizable compound is a photopolymerizable compound, (d) the photopolymerizable monomer is 1,4-butanedioldiglycidyl ether diacrylate, (e) the partition wall comprises a polymer of the polymerizable compound, (f) the photopolymerizable monomer is fluorine-containing acrylate, (g) the photopolymorizable monomer or oligomer comprises at least two species of monomers or oligomers, at least one of which is a fluorine-containing acrylate, (h) the photopolymerizable monomer or oligomer comprises at least two species of monomers or oligomers at least one of which is polytetramethylene ether glycol= di(2-maleimide acetate), (i) the dispersion liquid and the sealing film precursor are insoluble in each other, (j) the layer of bonding film precursor is disposed at least on the upper end portion of the partition wall before the polymerization, (k) the disposition of the layer of bonding film precursor is performed by transfer of the polymerizable compound from a substrate, to which the polymerizable compound is applied, onto the upper end portion of the partition wall, (k) the layer of bonding film precursor is disposed on the partition wall by coating the polymerizable compound on the surface of the substrate on which the partition wall is formed, (m) the partition wall comprises a polymer of the polymerizable compound, (n) the polymerization is performed in a state that the layer of bonding film precursor is supported by a planer supporting member, (o) the supporting member is removed after the polymerization, (p) the layer of sealing film precursor is formed by spraying a volatile liquid containing the polymerizable compound dissolved therein onto the exposed surface of the dispersion liquid and the layer of bonding film precursor and volatilizing the volatile liquid, (q) the layer of sealing film precursor is formed by applying the sealing film precursor onto the exposed surface of the dispersion liquid and the layer of bonding film precursor, (r) the layer of sealing film precursor includes two layers, (s) one of the two layers constituting the sealing film precursor layer is formed by application of the polymerizable compound, and (t) a layer contacting the dispersion liquid exposed surface o the two layers constituting the sealing film precursor layer comprises a polymer of the polymerizable compound used in (s).

(1) Hereinbelow, an embodiment of the production process according to the first aspect of the present invention will be described specifically with reference to the drawings.

FIG. 1 is a schematic sectional view of a display device produced through a first embodiment of the production process according to the first aspect of the present invention.

Referring to FIG. 1, the display device includes a substrate 10, partition walls 20 disposed so as to surround and define pixels, a sealing film 30, a dispersion medium 40, electrophoretic compounds 50, a first electrode 70 disposed at each pixel, a second electrode disposed at each pixel, and a switching device 80, such as TFT (thin film transistor), disposed with respect to each pixel. From FIG. 1, other structural members for the display device, such as an electric signal application means for applying an electric signal between the electrodes are omitted.

The display device produced through the production process of the present invention reflects a distribution state of the electrophoretic particles 50 in a display state.

More specifically, in an area indicated by A, a distribution state wherein the electrophoretic particles 50 gather on the partition wall 20 side is shown. When the area A is observed from the sealing film 30 side of the display device, the area A looks white if the surface of the first electrode 60 is white. On the other hand, in an area indicated by B, a distribution state wherein the electrophoretic particles 50 are dispersed in the substrate surface direction is shown. When the area B is observed from the sealing film 30 side, the area B looks like the color (black in this embodiment) of the electrophoretic particles 50.

In order to change the display state, the electrophoretic particles 50 are displaced on the substrate to be changed in distribution state. For example, it is possible to electrophoretically move and displace the electrophoretic particles 50 by applying an electric signal between the first and second electrodes. In the present invention, a method of displacing the electrophoretic particles on the substrate required at the time of changing the display state is not particularly limited. For example, the electrophoretic particles may undergo displacement on the substrate by utilizing dielectric migration force or electrically hydrodynamic flow of the dispersion medium.

In the above description, the color of the electrophoretic particles is black and that of the first electrode surface is white but are not limitative. For example, it is also possible to effect color display by appropriately changing the color of the first electrode surface to red, green, blue, etc.

In FIG. 1, the electrode system (structure) is disposed on the substrate 10 side. The electric field created by the electrode system largely displaces the electrophoretic particles in the planar direction of the sealing film. In the present invention, however, it is also possible to adopt an electrode structure for largely displacing the electrophoretic particles in the vertical direction of the sealing film as long as a desired display state is created.

Figure 7:
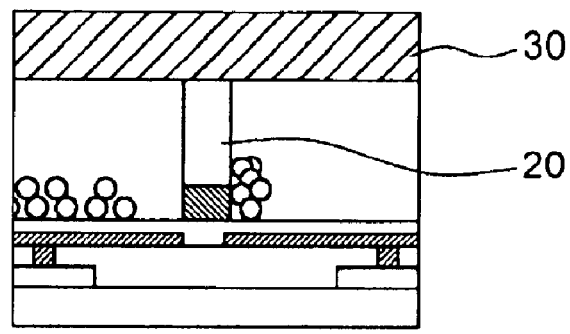
Figure 9:
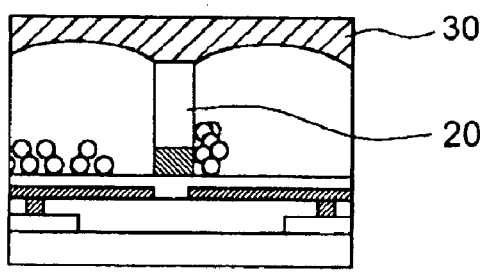

The sealing film 30 shown in FIG. 1 has such a sectional configuration (shape) that it is curved toward the substrate side but may also have a planar configuration or such a configuration that it is curved toward a direction opposite to the substrate, as shown in FIGS. 7 and 9, respectively.

Figure 2:
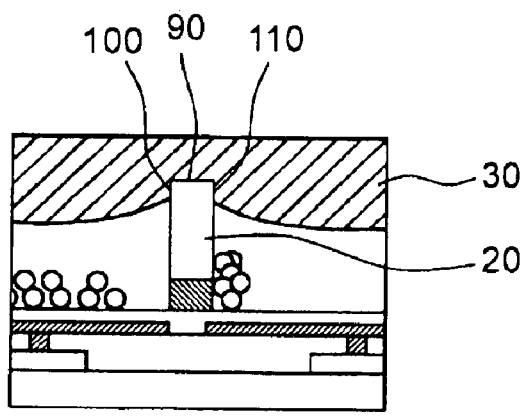
FIG. 2 is an enlarged sectional view of the display device of FIG. 1.
Figure 6:
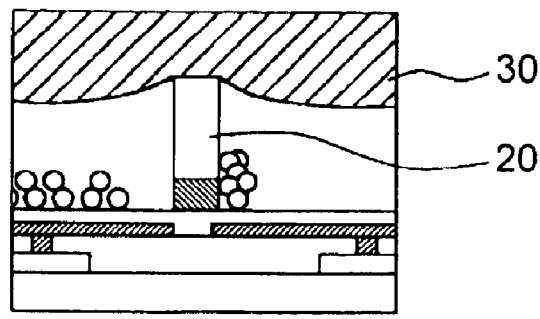
FIGS. 6, 7, 8 and 9 are enlarged sectional views of the display device showing a portion in the neighborhood of a partition wall 20.
Figure 8:
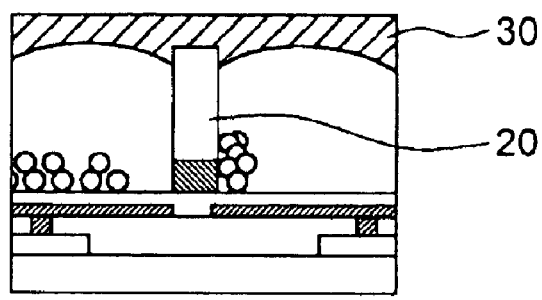

The sealing film is sufficient if it is adhered to at least a part of the upper end portion of the partition wall but may preferably be adhered to the entire surface of the upper end portion of the partition wall as shown in, e.g., FIGS. 6, 7 and 9, more preferably be adhered to not only the entire surface of the upper end portion of the partition wall as shown in, e.g., FIGS. 2 and 8. This is because as an adhered area of the sealing film to the partition wall becomes larger, adhesive properties between the sealing film and the partition wall also become larger. FIG. 2 schematically shows such a state that the sealing film which is curved toward the substrate 10 side adheres to the upper end portion 90 and a part of side portions 100 and 110 of the partition wall 20.

Next, an embodiment of the production process of the display device shown in FIG. 1 will be explained with reference to process drawings of FIGS. 3–5.

<Step 1>

Figure 3:
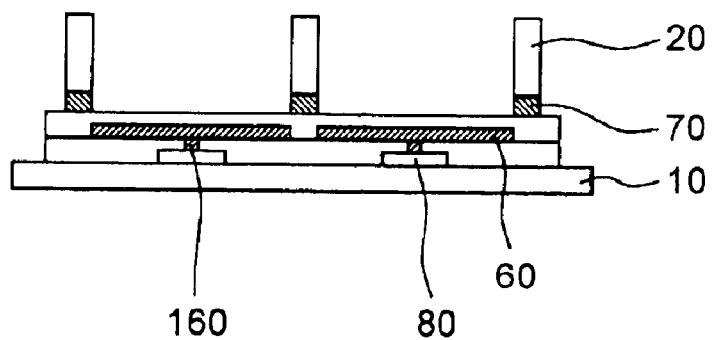
FIGS. 3, 4 and 5 are schematic views for illustrating the process for producing the display device according to the present invention.

FIG. 3 schematically illustrates Step 1 which is a step until formation of the partition wall 20.

First, on he substrate 10, switching devices 80 are formed and then covered with an insulating layer. In the insulating layer, contact holes 160 are provided. Thereafter, on the insulating layer, a resist pattern for scattering incident light is formed, and thereon, a first electrode 60 (of, e.g., aluminum exhibiting a high light reflectance) is formed so as to be connected with the switching device 80 through the contact hole 160. If the first electrode 60 has the highlight reflectance, it also functions as a light reflecting/scattering layer.

The first electrode 60 is covered with an insulating light scattering layer. On the light scattering layer, a second electrode 70 and a partition wall 20 are formed. The partition wall may be formed through any method as long as a desired partition wall can be formed. For example, the partition wall can be formed through a known photolithographic process.

After the partition wall is formed, it is possible to cover the surfaces of the insulating light scattering layer, disposed on the first electrode, and the second electrode.

<Step 2>

Figure 4:
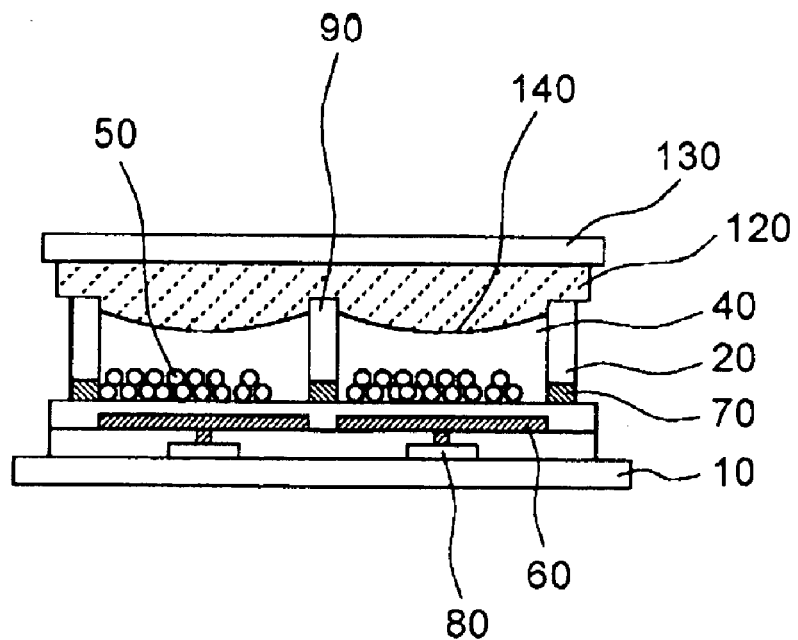

FIG. 4 schematically illustrates Step 2 which is a step until creation of a state immediately before polymerization of a sealing film precursor by disposing a layer of sealing film precursor comprising a polymerizable compound at a desired position.

In such a state, a layer 120 of the sealing film precursor comprising a polymerizable compound is disposed between a supporting member 130 for supporting the sealing film precursor layer 120 and the substrate 10 on which at least the electrophoretic particles 50 and the dispersion medium 40 are disposed between adjacent partition walls 20.

Further, in this embodiment, the sealing film precursor layer 120 contacts an exposed surface 140 of the dispersion medium, filled between the adjacent partition walls 20, and at least a part of the upper end portion 90 of the partition wall 20.

As described above, in this embodiment, the sealing film precursor layer 120 comprising the polymerizable compound is supported by the supporting member 130, so that even if a specific gravity of the sealing film precursor is larger than that of the dispersion medium, the sealing film precursor cannot sink to the bottom of the dispersion medium layer. In other words, there is no limit on the specific gravity of the sealing film precursor. Further, since the sealing film precursor layer 120 is supported by the supporting member, it does not contact ambient air directly, so that a UV polymerizable material which is polymerized, through radical polymerization is used as the polymerizable compound constituting the sealing film precursor. In addition, an occurrence of droplet formation can be obviated, so that, e.g., the thickness of the sealing film can be uniformized over a wide area.

If the above described arrangement of the respective members is realized, there are no limits on method of disposing the sealing film precursor, the dispersion medium, etc. For example, after a mixture (dispersion liquid) comprising the dispersion medium and the electrophoretic particles is filled between adjacent partition walls, the supporting member provided with the layer of sealing film precursor may be formed on the partition wall formed substrate. Alternatively, after the electrophoretic particles are placed between the adjacent partition walls, the supporting member provided with the sealing film precursor layer is disposed opposite to the partition wall formed substrate with a predetermined spacing therebetween, and through the spacing, the dispersion medium is injected, Thereafter, the supporting member may be pressed against the partition wall formed substrate.

<Step 3>

Figure 5:
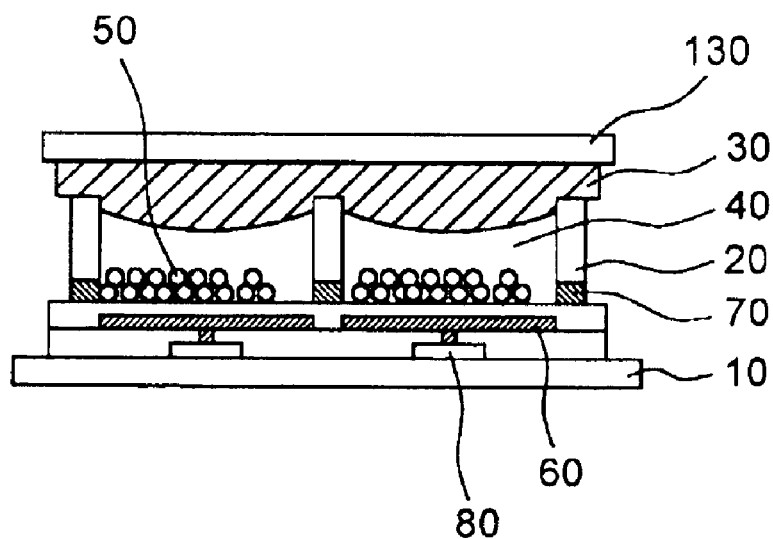

FIGS. 4 and 5 schematic illustrate Step 3 which is step until formation of the sealing film polymerizing the sealing film precursor constituting the sealing film precursor layer 120.

Polymerization of the sealing film precursor is characterized in that it is performed in such a state that the sealing film precursor layer 120 is supported by the supporting member 130 as shown in FIG. 4. By effecting the polymerization in the state, a sealing film 30 is formed as shown in FIG. 5.

The polymerizing method may be selected depending on the kind and property of the polymerizable compound constituting the sealing film precursor. For example, if the polymerizable compound is a UV polymerizable material, the polymerization may be performed by UV irradiation.

It is also possible to remove the supporting member 130 as desired. In this case, the display device as shown in FIG. 1 is formed. After the removal of the supporting member 130, another film may be formed on the sealing film.

In the foregoing description, connection with an electric signal application mean and other steps are omitted.

(2) Hereinbelow, with reference to FIGS. 12–18, an embodiment of the production process according to the second aspect of the present invention will be specifically described.

Figure 12:
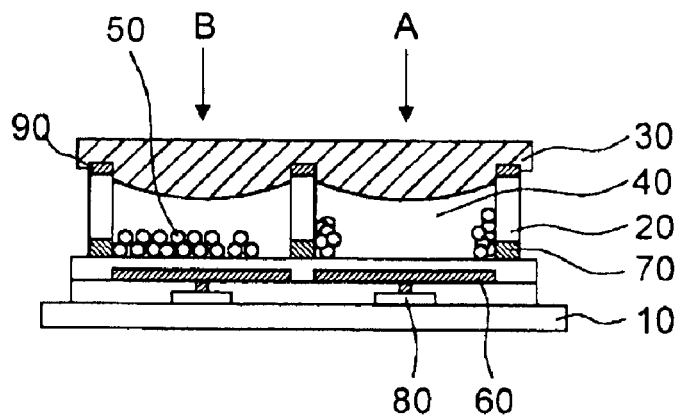

FIG. 12 is a schematic sectional view showing an embodiment of the display device produced through the production process of this embodiment.

Referring to FIG. 12, the display device includes a substrate 10, partition walls 20 disposed so as to surround and define pixels, a sealing film 30 to be formed by polymerizing a sealing film precursor comprising a polymerizable compound as described later, a dispersion medium 40, electrophoretic compounds 50, a first electrode 70 disposed at each pixel, a second electrode disposed at each pixel, and a switching device 80, such as TFT (thin film transistor), disposed with respect to each pixel, and a bonding film 90 for enhancing adhesive properties between the partition wall 20 and the sealing film 30. The bonding film is formed by polymerizing a bonding film precursor, comprising the polymerizable compound, disposed on an upper end portion of the partition wall 20 before the polymerization. In the polymerization process, the bonding film and the sealing film are connected and bonded to each other. From FIG. 12, other structural members for the display device, such as an electric signal application means for applying an electric signal between the electrodes are omitted.

The display device produced through the production process of the present invention reflects a distribution state of the electrophoretic particles 50 in a display state.

More specifically, in an area indicated by A in FIG. 12, a distribution state wherein the electrophoretic particles 50 gather on the partition wall 20 side is shown. When the area A is observed from the sealing film 30 side of the display device, the area A looks white if the surface of the first electrode 60 is white. On the other hand, in an area indicated by B in FIG. 12, a distribution state wherein the electrophoretic particles 50 are dispersed in the substrate surface direction is shown. When the area B is observed from the sealing film 30 side, the area B looks like the color of the electrophoretic particles 50.

The method of changing the display state is the same as in that in the embodiment according to the first aspect of the present invention.

In FIG. 12, the electrode system (structure) is disposed on the substrate 10 side. The electric field created by the electrode system largely displaces the electrophoretic particles in the planar direction of the sealing film. In this embodiment, however, it is also possible to adopt an electrode structure for largely displacing the electrophoretic particles in the vertical direction of the sealing film as long as a desired display state is created.

Figure 15:
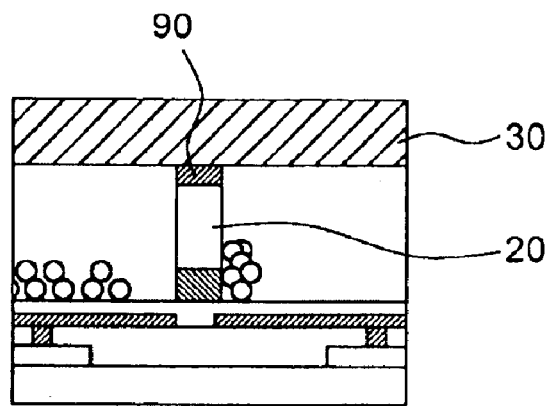
Figure 16:
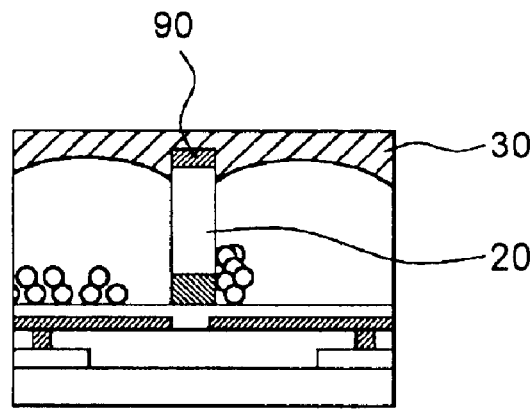

The sealing film 30 shown in FIG. 12 has such a sectional configuration (shape) that it is curved toward the substrate side but may also have a planar configuration or such a configuration that it is curved toward a direction opposite to the substrate, as shown in FIGS. 15 and 16, respectively.

Figure 13:
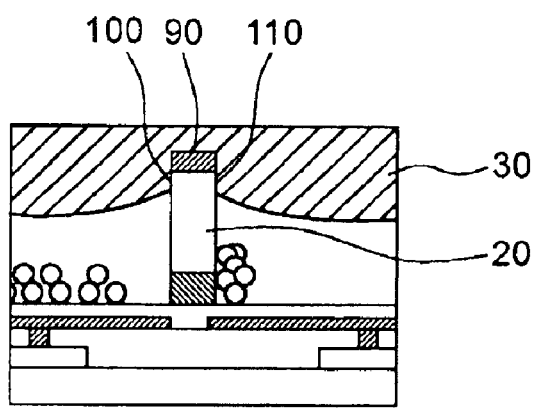
FIGS. 13, 14, 15, 16 and 17 are respectively an enlarged sectional view of the display device showing a portion in the neighborhood of a partition wall 20.
Figure 14:
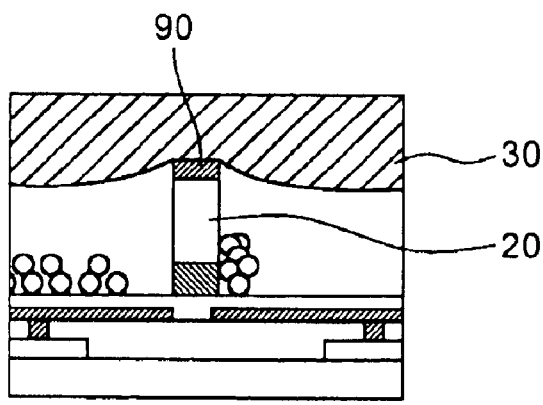
Figure 17:
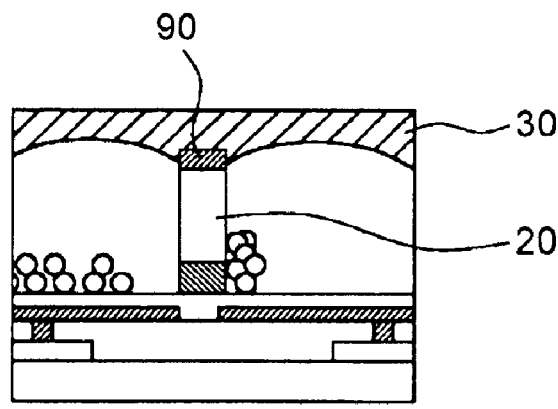

The sealing film is sufficient if it is adhered to at least a part of the upper end portion of the partition wall but may preferably be adhered to the entire surface of the upper end portion of the partition wall as shown in, e.g., FIGS. 14, 15 and 17, more preferably be adhered to not only the entire surface of the upper end portion of the partition wall as shown in, e.g., FIGS. 13 and 16. This is because as an adhered area of the sealing film to the partition wall becomes larger, adhesive properties between the sealing film and the partition wall also become larger. FIG. 13 schematically shows such a state that the sealing film which is curved toward the substrate 10 side adheres to the upper end portion 90 and a part of side portions 100 and 110 of the partition wall 20.

Figure 18:
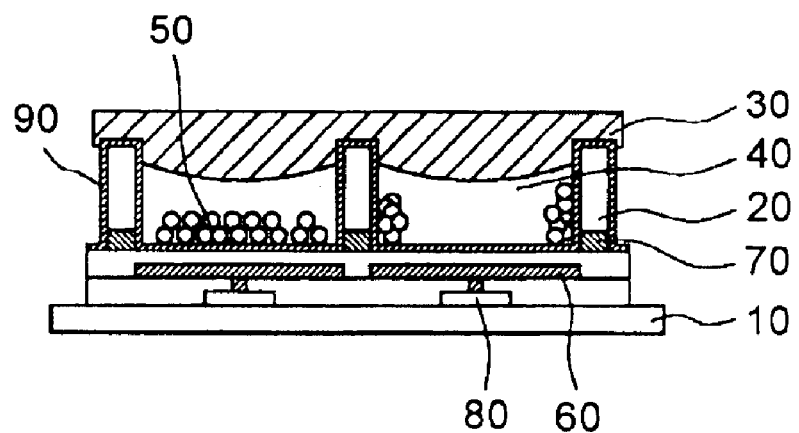
FIG. 18 is a schematic sectional view illustrating another embodiment of an electric display device produced through the process of the present invention.

In this embodiment, before the polymerization, at least the upper end portion of the partition wall is constituted by the bonding film precursor layer. In FIGS. 12–17, only the upper end portion is constituted by the bonding film precursor layer. In this embodiment, however, the polymerizable compound may be disposed at not only the upper end portion but also the entire surface of side portions of the partition wall, followed by polymerization to form a bonding film 90 as shown in FIG. 18.

Next, an embodiment of the production process of the display device shown in FIG. 12 will be explained with reference to process drawings of FIGS. 19–26.

<Step 1>

Figure 19:
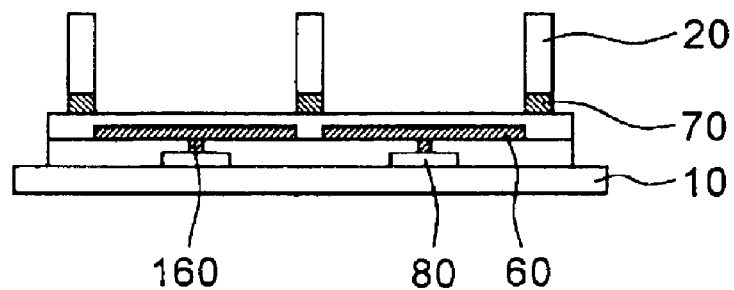
FIGS. 19 to 28 are schematic sectional views for illustrating the production processes of display devices of the present invention.

FIG. 19 schematically illustrates Step 1 which is a step until formation of the partition wall 20.

First, on he substrate 10, switching devices 80 are formed and then covered with an insulating layer. In the insulating layer, contact holes 160 are provided. Thereafter, on the insulating layer, a resist pattern for scattering incident light is formed, and thereon, a first electrode 60 (of, e.g., aluminum exhibiting a high light reflectance) is formed so as to be connected with the switching device 80 through the contact hole 160. If the first electrode 60 has the highlight reflectance, it also functions as a light reflecting/scattering layer.

The first electrode 60 is covered with an insulating light scattering layer. On the light scattering layer, a second electrode 70 and a partition wall 20 are formed. The partition wall may be formed through any method as long as a desired partition wall can be formed. For example, the partition wall can be formed through a known photolithographic process.

<Step 2>

Figure 20:
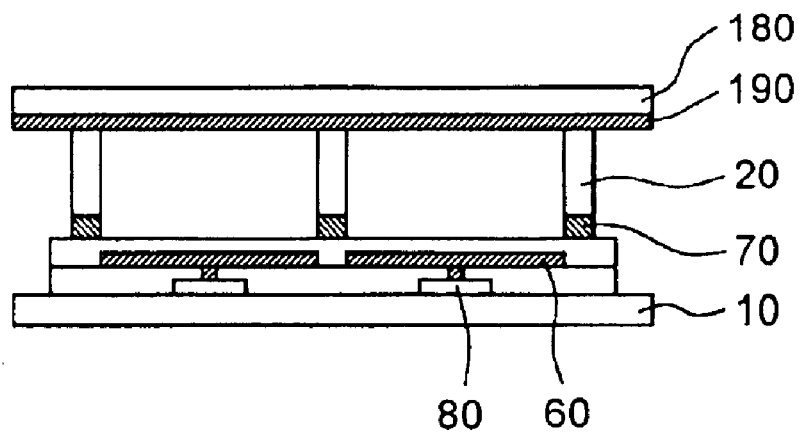
Figure 21:
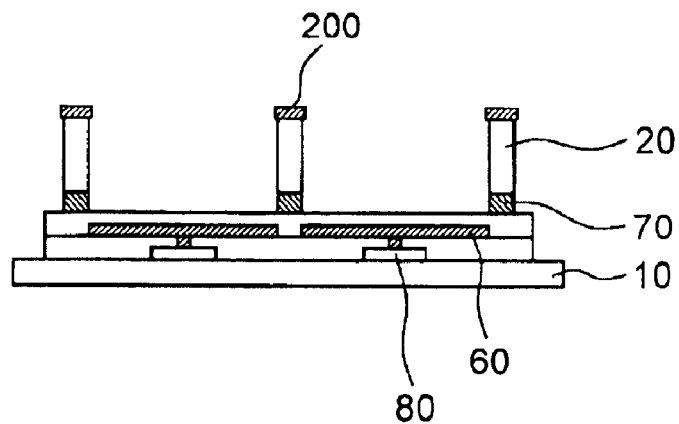
Figure 22:
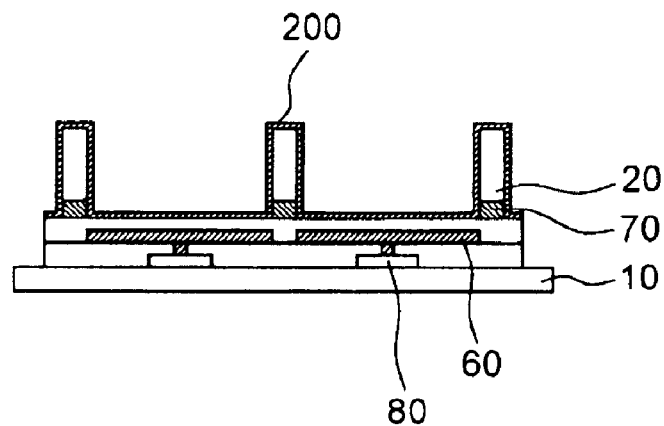

FIGS. 20–22 schematic illustrate Step 2 which is a step until disposition o the layer of bonding film precursor comprising a polymerizable particle at least at an upper end portion of the partition wall.

The polymerizable compound used in this step may preferable be identical to that constituting a precursor for the sealing film described later.

A specific example of Step will be described.

First, a substrate onto which a polymerizable compound is applied is prepared. The applied surface of the substrate is caused to contact the upper end portion of the partition wall prepared in Step 1 as shown in FIG. 20. Referring to FIG. 20, a reference numeral 190 represents a polymerizable compound applied onto a substrate 180. Thereafter the substrate 180 is removed from the partition wall 20, whereby the polymerizable compound 190 is transferred from the substrate 180 to the upper end portion of the partition wall 20 as shown in FIG. 21. Referring to FIG. 21, a reference numeral 200 represents a layer of bonding film precursor comprising the polymerizable compound transferred onto the upper end portion of the partition wall 20.

In this embodiment, the polymerizable compound 200 may also be disposed at the entire surface of side portions of the partition wall 20 as well as at the upper end portion as shown in FIG. 22. Such a disposition of the polymerizable compound may be performed by, e.g., coating or adsorption of the polymerizable compound.

In the case where the partition wall is formed of a polymerizable compound constituting the sealing film precursor, the polymerizable compound has already been disposed also at the upper end portion of the partition wall, so that the above-mentioned disposition of polymerizable compound (by, e.g., transfer or coating) may be omitted or performed as desired.

The polymerizable compound may preferably have an affinity to the partition wall. This is because not only the disposition of the polymerizable compound at the upper end portion of the partition wall is readily performed but also adhesive properties, after the polymerization of the polymerizable compound, between a polymer of the polymerizable compound and the partition wall become good.

In case of necessity, a treatment for improving the adhesive properties of the polymer of polymerizable compound disposed at least at the upper end portion of the partition wall with the upper end portion of the partition wall may be effected. For example, it is possible to improve the adhesive properties by forming a minute unevenness at the partition wall upper end portion by, e.g., dry etching. Alternatively, it is also possible to chemically fix the polymerizable compound at least to the upper end portion of the partition wall, e.g., by utilizing a functional group (such as —OH or —COOH) formed by ozone treatment to at least the partition wall upper end portion. Further, it is also possible to partially polymerize the layer of bonding film precursor.

<Step 3>

Figure 23:
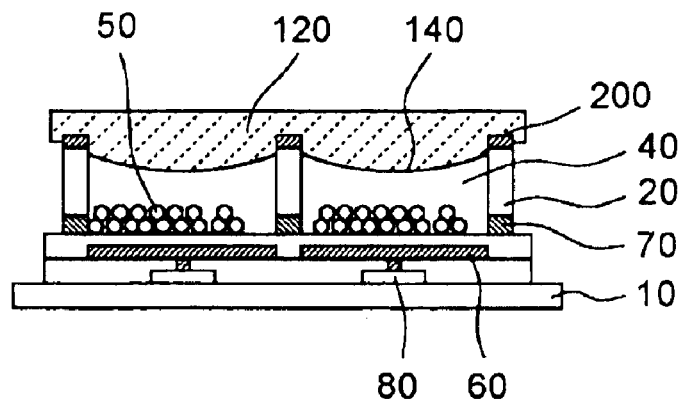
Figure 24:
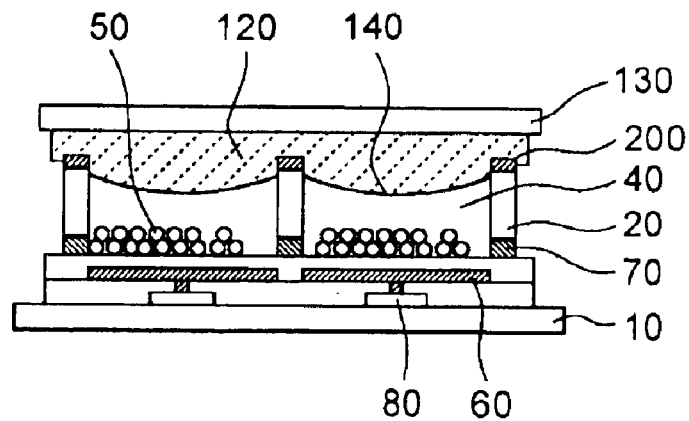

FIGS. 23 and 24 schematically illustrate Step 3 which is a step until creation of a state immediately before polymerization of a sealing film precursor by disposing a layer of sealing film precursor comprising a polymerizable compound at a desired position.

In such a state, in this embodiment, the sealing film precursor layer 120 contacts an exposed surface 140 of the dispersion medium, filled between the adjacent partition walls 20, and at least a part of the upper end portion of the partition wall 20 as shown in FIG. 23.

As described above, in this embodiment, at least the upper end portion of the partition wall is constituted by the bonding film precursor layer 200 comprising the polymerizable compound. For this reason, when the polymerization process described later is performed, the polymer of the sealing film precursor and the polymer of the bonding film precursor (i.e., the bonding film) connects to each other, so that adhesive properties therebetween can be improved.

The polymerizable compound used in this embodiment is characterized in that it is not soluble (mixed) in the dispersion medium. For this reason, when the layer of sealing film precursor is disposed on the dispersion medium in this embodiment, a part of the dispersion medium present between the sealing film precursor and the partition wall present between the sealing film precursor and the partition wall flows out of the structure. The flowing out phenomenon of the dispersion medium is accelerated by not only the sealing film precursor layer but also the polymerizable compound constituting the bonding film precursor dispersed at the upper end portion. Even when a slight part of the layer of sealing film precursor contacts that of the partition wall upper end portion, they begin to contact each other as if a zipper is closed. At the same time, the flowing out phenomenon of the dispersion medium is further accelerated. As a result, it becomes possible to realize, with reliability, the contact of the layer of sealing film precursor with the partition wall required to ensure bonding between the sealing film and the partition wall even in the dispersion medium.

In this step, the sealing film precursor layer 120 comprising the polymerizable compound may be supported by the supporting member 130 as shown in FIG. 24, so that even if a specific gravity of the sealing film precursor is larger than that of the dispersion medium, the sealing film precursor cannot sink to the bottom of the dispersion medium layer. In other words, there is no limit on the specific gravity of the sealing film precursor. Further, since the sealing film precursor layer 120 is supported by the supporting member, it does not contact ambient air directly, so that a UV polymerizable material which is polymerized, through radical polymerization is used as the polymerizable compound constituting the sealing film precursor. In addition, an occurrence of droplet formation can be obviated, so that, e.g., the thickness of the sealing film can be uniformized over a wide area.

If the above described arrangement of the respective members is realized, there are no limits on method of disposing the sealing film precursor, the dispersion medium, etc. For example, a polymerizable compound or a volatile liquid in which the polymerizable compound is dissolved may be minutely sprayed onto an upper end portion (exposed surface) of the dispersion medium. The polymerizable compound used in this embodiment is insoluble in the dispersion liquid, so that the polymerizable compound is localized as a thin film at the exposed surface of the dispersion liquid. This phenomenon is liable to occur when the polymerizable compound has —OH group or —O— group. As described later, the polymerizable compound in this embodiment has such a group in its structure.

Further, the polymerizable compound may be applied onto the exposed surface and the layer of bonding film precursor.

If necessary, the layer of bonding film precursor may have a laminated structure including two or more layers. For example, on a first layer contacting the exposed surface of the dispersion liquid, a second layer of the polymerizable compound may be disposed. For example, the second layer may be prepared by applying the polymerizable compound onto the first layer without using the above described supporting member. The first layer may be prepared by the minute spray method as described above. The first layer may be formed of the polymerizable compound or a polymer of the polymerizable compound.

On the other hand, after a mixture (dispersion liquid) comprising the dispersion medium and the electrophoretic particles is filled between adjacent partition walls, the supporting member provided with the layer of sealing film precursor may be formed on the partition wall formed substrate. Alternatively, after the electrophoretic particles are placed between the adjacent partition walls, the supporting member provided with the sealing film precursor layer is disposed opposite to the partition wall formed substrate with a predetermined spacing therebetween, and through the spacing, the dispersion medium is injected. Thereafter, the supporting member may be pressed against the partition wall formed substrate.

<Step 4>

Figure 25:
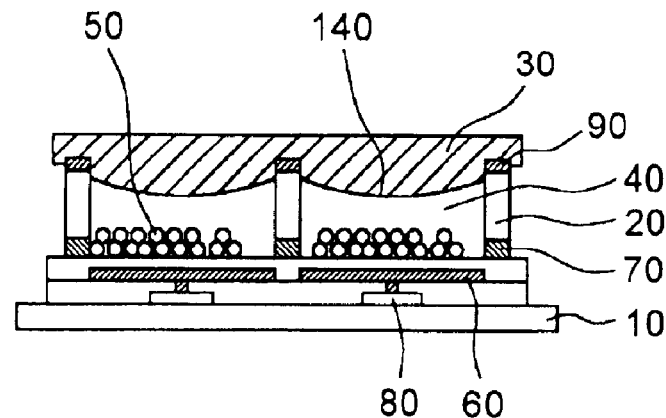
Figure 26:
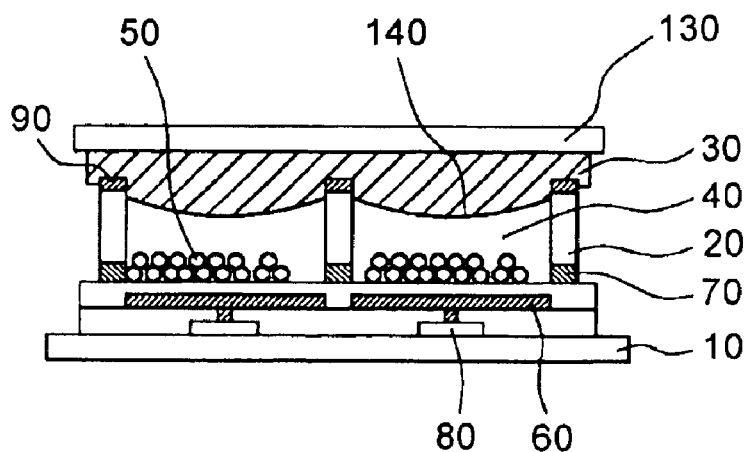

FIGS. 25 and 26 schematic illustrate Step 4 which is step until formation of the sealing film polymerizing the sealing film precursor constituting the sealing film precursor layer 120 and the bonding film precursor constituting the bonding film precursor layer 200 disposed on the partition wall upper end portion.

By effecting the polymerization of the sealing film precursor shown in FIGS. 23 and 24, a sealing film 30 is formed as shown in FIGS. 25 and 26. At the same time, the bonding film precursor is also polymerized to form the bonding film 90.

By the polymerization in this step, the polymerizable compound constituting the bonding film precursor layer disposed at least at the partition wall upper end portion and the polymerizable compound constituting the sealing film precursor are bonded to each other, so that adhesive properties between the sealing film and the bonding film. On the other hand, the bonding film is bonded to the upper end portion of the partition wall as described above. Accordingly, the adhesive properties of the sealing film prepared in this step with the partition wall are ensured.

The polymerizing method may be selected depending on the kind and property of the polymerizable compound constituting the sealing film precursor. For example, if the polymerizable compound is a UV polymerizable material, the polymerization may be performed by UV irradiation.

It is also possible to remove the supporting member 130 in the case of the display device shown in FIG. 26. In this case, the display device as shown in FIG. 25 is formed. After the removal of the supporting member 130, another film may be formed on the sealing film. Similarly, another film may also be formed on the sealing film of the display device shown in FIG. 25.

In the foregoing description, connection with an electric signal application mean and other steps are omitted.

(3) Hereinbelow, materials on the like applicable to the embodiments of the production processes according to the first and second aspects of the present invention will be specifically described.

The dispersion medium used in the present invention is an insulating liquid. As the insulating liquid, it is possible to use an organic solvent, such as isoparaffin (e.g., trade name: "Isoper", mfd. by Exxon Corp.), silicone oil, xylene or toluene.

The electrophoretic particles are not particularly restricted in material, particle size and color as long as they can effect a desired display. It is preferable that a material therefor is colored and possesses good negative or positive chargeability. Examples of such material may include various inorganic and organic pigments, carbon black and resins containing the pigments or carbon black. The particle size of the exposed surfaces may generally be ca. 0.01–50 $\mu$m, preferably ca. 0.1–10 $\mu$m.

In the above-mentioned insulating liquid or the electrophoretic particles, a charge control agent for controlling and stabilizing chargeability of the electrophoretic particles may be added. Examples of the charge control agent may include succinimide, monoazo dye metal complex salt, salicyclic acid, organic quaternary ammonium salt, and nigrosin compound.

Next, the sealing film precursor used in the present invention will be described.

The sealing film precursor may preferably be liquid and is characterized by being insoluble in the dispersion medium described above.

Herein, the term "insoluble" or "not soluble" means that two compounds (e.g., the sealing film precursor and the dispersion liquid) have a larger difference in solubility parameter. The difference may generally be not less than 0.1, preferably not less than 0.5, more preferably not less than 1.0.

Further, the sealing film precursor is characterized by having a small affinity to the electrophoretic particles and by not dissolving therein the electrophoretic particles.

The polymerizable compound constituting such a sealing film precursor is not particularly limited so long as it can form a desired sealing film, but may preferably have a partial structure having at least one group selected from the group consisting of —O—, —CH$_2$O—, —OH and —CH$_2$—.

By having such a partial structure, the resultant sealing film is not mixed (dissolved) in the dispersion medium. Further, it is also possible to control a physicochemical interaction between the resultant sealing film and the electrophoretic particles. As described above, when the polymerizable compound has the above-mentioned partial structure, it is effective in not only producing the sealing film but also controlling the functions of the sealing film. Adhesion (force) between the electrophoretic particles and the sealing film is an example of the physicochemical interaction and can be controlled by surface energy of the sealing film. As the surface energy of the sealing film is smaller, the resultant adhesion can be made smaller.

The polymerizable compound having the partial structure of —CH$_2$—O— may include polymerizable compounds having a unit of —CH$_2$—CH$_2$—O—, a polyethylene glycol unit of —(CH$_2$—CH$_2$O)$_n$— (n: integer), or a unit of —CH$_2$—O—CH$_2$—CH$_2$—CH$_2$—CH$_2$—O—CH$_2$—.

Further, the polymerizable compound having the partial structure of —O— may include polymerizable compounds having adjacent groups —O— and —CH$_2$— (e.g., polyethylene glycol type) or having a unit not containing adjacent —CH$_2$— group (e.g., carbonate linkage).

The polymerizable compound having the partial structure of —CH$_2$— may include polymerizable compounds having a unit of repetitive —CF$_2$— group.

The polymerization process for the sealing film is not restricted as long as a desired sealing film can be prepared. For example, the sealing film can be formed through a photopolymerization process represented by UV polymerization.

In the case of employing the UV polymerization, it is possible to utilize a radical-polymerizable acrylate or methacrylate compound, having the partial structure of —OH, —CH$_2$—O—, —O—, —CF$_2$—, as the polymerizable compound. For example, such a (meth-)acrylate compound may include: 2-hydroxyethyl methacrylate; 1,4-butanediol diglycidyl ether diacrylate; polyethyleneglycol monomethacrylate (e.g., "Blenmer PE" series, mfd. by Nippon Yushi K.K.); polytetramethylene ether glycol=di(2-maleimide acetate) (e.g., "MIA 200", mfd. by Dainippon Ink And Chemicals, Inc.); 1H,1H,5H-octafluoropentyl acrylate (e.g., "V-8F", mfd. by Osaka Yuki Kagaku Kogyo K.K.); and 1H,1H,2H, 2H-heptadecafluorodecyl acrylate (e.g., "V-17F", mfd. by Osaka Yuki Kagaku Kogyo K.K.).

The polymerizable compound may be a polymerizable monomer or a polymerizable oligomer. These monomer and oligomer may be monofunctional compounds or polyfunctional compounds. Further, the polymerizable compound may be a mixture of the monomer and the oligomer or a mixture of the monofunctional and polyfunctional compounds.

The polymerizable compound may be polymerized by irradiating it with light (e.g., UV light) in the presence of a photopolymerization initiator, such as "Irgacure 184" or "Irgacure 641" both available from Ciba Speciality Chemical K.K.) or "MIA 200" available from Dainippon Ink And Chemicals Inc.

The supporting member is not limited so long as a desired sealing film can be formed but the surface thereof may preferably have an affinity or compatibility to the sealing film precursor. Based on the affinity, e.g., in the above-mentioned Step 2, the supporting member can effectively support the layer of sealing film precursor.

As such a supporting member applicable to the present invention, it is possible to use not only a soft (flexible) substrate of PET (polyethylene terephthalate), PC (polycarbonate), PES (polyethersulfone), etc., but also a hard substrate of glass, quartz, etc. The supporting member may preferably be transparent. Further, in the case where a light wavelength region for the photopolymerization described above is UV region, the supporting member is also required to exhibit UV transmission properties.

If the supporting member surface has no affinity to the sealing film precursor, it is required to undergo an affinity-imparting treatment, e.g., by disposing a film of polymer of the polymerizable compound constituting the sealing film precursor at the supporting member surface. It is also possible to use other methods as long as they can impart the affinity (to the sealing film precursor) t the supporting member surface.

The partition wall applicable to the present invention may include a thick film of a cured product of a photoresist (e.g., "SU-8", mfd. by Minesota Mining & Manufacturing Co.).

The upper end portion of the partition wall may preferably have an affinity to the sealing film precursor. Based on the affinity, the following advantages are attained. First, it is possible to ensure adhesive properties between the partition wall upper end portion and the sealing film. Secondly, e.g., in Step 2 of the embodiment of the production process according to the first aspect of the present invention, it is possible to prevent the dispersion medium from entering the contact portion of the layer of sealing film precursor with the partition wall. This is because the sealing film precursor and the dispersion medium are insoluble in each other and the sealing film precursor has the affinity to the partition wall upper end portion. In other words, the dispersion medium located between the sealing film precursor layer and the partition wall upper end portion is caused to sufficiently flow-out.

If the partition wall upper end portion has no desired affinity to the sealing film precursor, it is required to undergo an affinity-imparting treatment, e.g., by applying the polymerizable compound constituting the sealing film precursor or a polymer of the polymerizable compound at the partition wall upper end portion and in the vicinity thereof. It is also possible to use other methods as long as they can impart the affinity (to the sealing film precursor) to the partition wall upper end portion and the vicinity thereof.

The substrate, on which the partition wall is formed, used in the present invention is not particularly limited. As such a substrate, it is possible to use not only a soft (flexible)

substrate of PET (polyethylene terephthalate), PC (polycarbonate), PES (polyethersulfone), etc., but also a hard substrate of glass, quartz, etc. The substrate surface contacting the dispersion medium may preferably have an affinity to the dispersion medium but has no property of being dissolved in the dispersion medium.

The material and arrangement of the electrodes used in the present invention are also not largely restricted so long as they can realize a desired display. The material for the electrodes may be Al or ITO (indium tin oxide). The electrode arrangement is not particularly limited so long as it can induce a desired displacement of the electrophoretic particles required to cause necessary change in display state. In the case of using the above-mentioned first electrode 60 as also the light reflection layer, a high light-reflective material such as silver (Ag) or aluminum (Al) may suitably be used. In the case of using the first electrode 60 as an electrode for white display, the first electrodes per se is provided with a surface unevenness so as to cause irregular reflection of light. Alternatively, on the first electrode, a light scattering layer may be formed.

(4) Hereinbelow, the present invention will be described based on Examples.

EXAMPLE 1

An electric display device as shown in FIG. 1 was prepared.

The resultant display device has 200×600 pixels each has a size of 240 $\mu$m×80 $\mu$m. Each pixel is surrounded by a partition wall 20 having a width of 8 $\mu$m and a height of 28 $\mu$m. A first electrode 60 is located between the adjacent partition walls 20 and is connected to a switching device 80. A second electrode 70 is located between the partition wall 20 and a substrate 10. The second electrode 70 is an electrode which is common to all the pixels.

A specific production process of the display device in this embodiment will be described with reference to FIGS. 3–5 and 10.

On a 0.1 mm-thick stainless steel substrate 10, a switching device 80 was formed. Then the substrate was coated with an insulating layer of acrylic resin, and the insulating layer was provided with a contact hole. Thereafter, on the insulating layer, a resist pattern for scattering incident light was formed and thereon, a first electrode 60 of aluminum was formed and electrically connected with the switching device 80 disposed on the substrate 10 through the contact hole. The first electrode 60 was covered with an acrylic resin layer. The first electrode 60 in this example also functioned as a light reflection/scattering layer (FIG. 3). On the acrylic resin layer, a second electrode 70 of dark black titanium carbide and a partition wall 20 of a pured product of a photoresist ("SU-8", mfd. by 3M) were formed in thick film by a known photolithographic process. After the formation of the second electrode 70, the surface of the acrylic resin layer on the first electrode 60 and the surface of the second electrode 70 were coated with a layer of polycarbonate.

Figure 10:
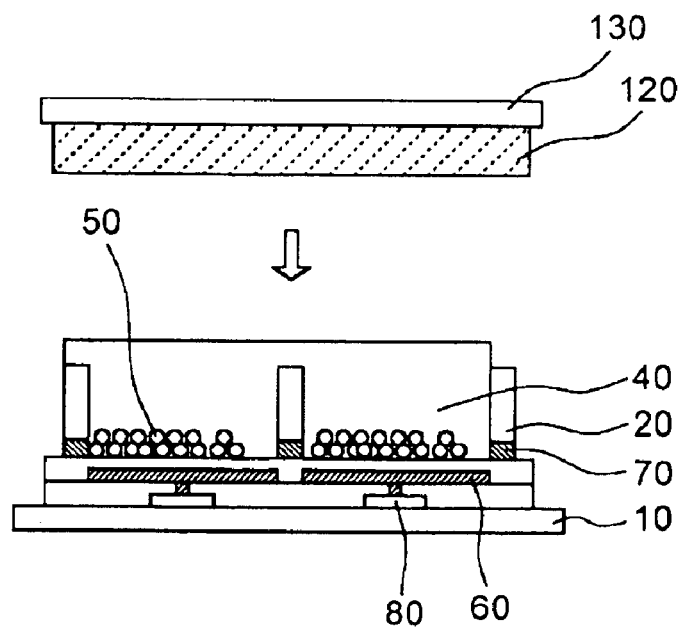
FIG. 10 is a schematic sectional view or illustrating the production process of the display device of the present invention.

After the coating, a dispersion liquid comprising a dispersion medium 40 and electrophoretic particles 50 was filled at each pixel (FIG. 10). As the dispersion medium 40, isoparaffin (trade name: "Isoper H"; specific gravity: 0.76; mfd. by Exxon Corp.) was used. As the electrophoretic compounds 50, particles (average particle size: 1–2 $\mu$m) of a styrene-methyl methacrylate copolymer resin containing carbon black were used. In the isoparaffin, succinimide (trade name: "OLOA1200", mfd. by Shevron Corp.) was added as a charge control agent.

On the other hand, on a PET substrate as a supporting member 130, a layer 120 of sealing film precursor was formed (FIG. 10). As the sealing film precursor, 1,4-butanediol diglycidyl ether diacrylate (trade name: "NK oligo EA-5520"; specific gravity: not less than 1; mfd. by Shin Nakamura Kagaku Kogyo K.K.) being a UV curable monomer was used. This acrylate monomer and Isoper H (as the dispersion medium) are not soluble in each other and the acrylate monomer has a specific gravity larger than that of Isoper H.

The sealing film precursor layer 120 was formed in a thickness of 7 $\mu$m by spin-coating the acrylate monomer mixed with 5 wt. % of a photopolymerization initiator ("Irgacure 184", available from Ciba-Gaigy, Ltd.) on the above-prepared supporting member 130.

Thereafter, the supporting member 130 was placed on the partition wall 20 and the dispersion medium 40 so that the sealing film precursor layer 120 contacted the partition wall 20 and the dispersion medium 40 (FIG. 10). AFter the lapse of several seconds from the contact, the sealing film precursor layer 120 pushed the dispersion liquid away to contact the partition wall 20, whereby a state in which the sealing film precursor layer 120 covered the upper end portion of the partition wall 20 and the exposed (outer) surface of the dispersion liquid was finally created (FIG. 4).

After such a state was created, the resultant structure was subjected to UV irradiation for 5 minutes at an intensity of 0.3 mW/cm at room temperature to effect polymerization of the sealing film precursor. As a result, a cured sealing film 30 was formed (FIG. 5).

After the polymerization, when the resultant display device was viewed from the side closer to the sealing film 30, the electrophoretic particles 50 were not observed at the upper end portion of the partition wall 20 and within the sealing film 30. In other words, during the polymerization process, the electrophoretic particles 50 were not incorporated into the sealing film 30.

Then, drive of the display device of this example was effected by alternately modulating an electric potential of the second electrode between +15 V and −15 V at a frequency of 1 Hz while grounding the first electrode. As a result, in synchronism with the alternating potential modulation, a resultant display state was alternately changed between a black state and a white state.

Even when such a drive of the display device was continued, a phenomenon that the electrophoretic particles 50 were displaced so as to flow over the partition wall 20 was not observed. In other words, it was confirmed that the dispersion liquid was confined by the sealing film, the partition wall, and the substrate. It was also confirmed that the sealing film was bonded to the partition wall without being peeled off.

EXAMPLE 2

An electric display device was prepared in the same manner as in Example 1 except that the supporting member 130 was removed from the sealing film 30 so as to expose the sealing film 30 to ambient air.

When the display device was driven similarly as in Example 1, the display device exhibited the same display state change as in Example 1. At the time of driving the display device, no phenomenon that the electrophoretic particles 50 were displaced so as to flow over the partition wall 20 was observed. Further, peeling-off of the sealing film 30 from the partition wall 20 side and volatilization of the dispersion medium 40 were also not observed, so that it was confirmed that the sealing film 30 and the partition wall 20 were bonded to each other.

Then, although the display device was bent backward and forward, such a phenomenon that the electrophoretic particles 50 were displaced so as to flow over the partition wall was not observed. Further, evaluation of the drive of the display device was performed in the same manner as in Example 1 in such a state that the display device was curved or inflected. As a result, the same display state change as in Example 1 was observed.

EXAMPLE 3

An electric display device was prepared in the same manner as in Example 1 except that the sealing film precursor was changed to polyethylene glycol methacrylate (trade name: "PE200"; specific gravity: not less than 1; mfd. by Nippon Yushi K.K.). The methacrylate is not soluble in Isoper H and has a specific gravity larger than Isoper H.

When the resultant display device was driven similarly as in Example 1, the same display state change as in Example 1 was observed. Even when a continuous drive of the display device was performed, no phenomenon that the electrophoretic particles 50 were displaced so as to flow over the partition wall 20 was observed. Further, the sealing film 30 was not peeled from the partition wall side.

EXAMPLE 4

An electric display device was prepared in the same manner as in Example 1 except that the material for the partition wall 20 was changed to a rod and coil-type block copolymer represented by the following formula (I):

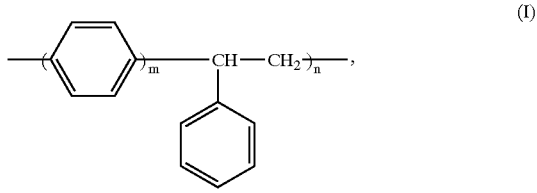

(I)

wherein m=40 and n=900.

The block copolymer had Mw/Mn (weight-average molecular weight/number-average molecular weight)<1.05.

The partition wall 20 was formed on the substrate by cast-coating a 3 wt. %-solution of the block copolymer in carbon disulfide at a humidity of 95% RH. The resultant partition wall 20 had a honeycomb structure which measured 50 $\mu$m in pore diameter, 5 $\mu$m in height, and 40 in aspect ratio.

A sealing film 30 was formed in the same manner as in Example 1 after the partition wall 20 was formed. After the sealing film 30 was formed, the supporting member was removed.

The resultant display device was driven similarly as in Example 1. As a result, a similar display state change as in Example 1 was observed. At the time of the drive of the display device, no phenomenon that the electrophoretic particles were displaced so as to flow over the partition wall was caused to occur. Further, peeling-off of the sealing film from the partition wall side was not observed.

EXAMPLE 5

Figure 11:
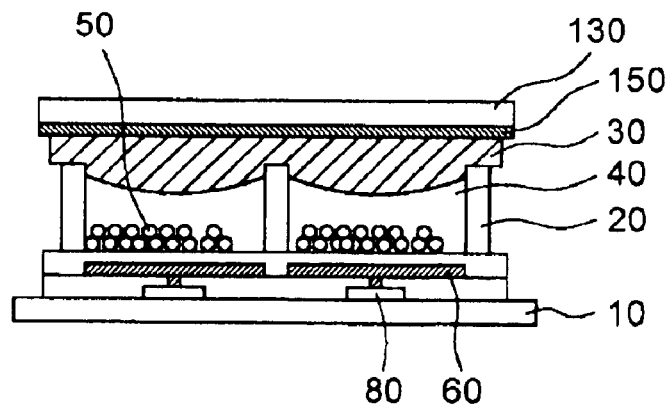
FIGS. 11 and 12 are respectively a schematic sectional view illustrating another embodiment of an electric display device produced through the process of the present invention.

An electric display device as shown in FIG. 11 was prepared.

The resultant display device has 200×600 pixels each has a size of 240 $\mu$m×80 $\mu$m. Each pixel is surrounded by a partition wall 20 having a width of 8 $\mu$m and a height of 28 $\mu$m. A first electrode 60 is located between the adjacent partition walls 20 and is connected to a switching device 80. A second electrode 150 is provided to a supporting member 130. The second electrode 150 is an electrode which is common to all the pixels.

A specific production process of the display device in this embodiment is basically identical to that in Example 1.

On a 0.1 mm-thick stainless steel substrate 10, a switching device 80 was formed. Then the substrate was coated with an insulating layer of acrylic resin, and the insulating layer was provided with a contact hole. Thereafter, on the insulating layer, a resist pattern for scattering incident light was formed and thereon, a first electrode 60 of aluminum was formed and electrically connected with the switching device 80 disposed on the substrate 10 through the contact hole. The first electrode 60 was covered with an acrylic resin layer. The first electrode 60 in this example also functioned as a light reflection/scattering layer. On the acrylic resin layer, a partition wall 20 of a pured product of a photoresist ("SU-8", mfd. by 3M) was formed in thick film by a known photolithographic process to define each of pixels.

Then, a dispersion liquid comprising a dispersion medium 40 and electrophoretic particles 50 was filled at each pixel (FIG. 10). As the dispersion medium 40, isoparaffin (trade name: "Isoper H"; specific gravity: 0.76; mfd. by Exxon Corp.) was used. As the electrophoretic compounds 50, particles (average particle size: 1–2 $\mu$m) of white titanium oxide were used. In the isoparaffin, succinimide (trade name: "OLOA1200", mfd. by Shevron Corp.) was added as a charge control agent and a blue dye were added.

On the other hand, on a PET substrate as a supporting member 130 provided with an ITO electrode layer as the second electrode 150, a layer 120 of sealing film precursor was formed. As the sealing film precursor, 1,4-butanediol diglycidyl ether diacrylate (trade name: "NK oligo EA-5520"; specific gravity: not less than 1; mfd. by Shin Nakamura Kagaku Kogyo K.K.) being a UV curable monomer was used. This acrylate monomer and Isoper H (as the dispersion medium) are not soluble in each other and the acrylate monomer has a specific gravity larger than that of Isoper H.

The sealing film precursor layer 120 was formed in a thickness of 7 $\mu$m by spin-coating the acrylate monomer mixed with 5 wt. % of a photopolymerization initiator ("Irgacure 184", available from Ciba-Gaigy, Ltd.) on the above-prepared supporting member 130 (provided with the second electrode 150).

Thereafter, the supporting member 130 was placed on the partition wall 20 and the dispersion medium 40 so that the sealing film precursor layer 120 contacted the partition wall 20 and the dispersion medium 40. AFter the lapse of several seconds from the contact, the sealing film precursor layer 120 pushed the dispersion liquid away to contact the partition wall 20, whereby a state in which the sealing film precursor layer 120 covered at least the upper end portion of the partition wall 20 and the exposed (outer) surface of the dispersion liquid was finally created.

After such a state was created, the resultant structure was subjected to UV irradiation for 5 minutes at an intensity of 0.3 mW/cm at room temperature to effect polymerization of the sealing film precursor. As a result, a cured sealing film 30 was formed (FIG. 11).

After the polymerization, when the resultant display device was viewed from the side closer to the sealing film 30, the electrophoretic particles 50 were not observed at the upper end portion of the partition wall 20 and within the sealing film 30. In other words, during the polymerization process, the electrophoretic particles 50 were not incorporated into the sealing film 30.

Then, drive of the display device of this example was effected by alternately modulating an electric potential of the second electrode between +15 V and −15 V at a frequency of 1 Hz while grounding the first electrode. As a result, in synchronism with the alternating potential modulation, a resultant display state was alternately changed between a white state and a blue state.

Even when such a drive of the display device was continued, a phenomenon that the electrophoretic particles 50 were displaced so as to flow over the partition wall 20 was not observed. In other words, it was confirmed that the dispersion liquid was confined by the sealing film, the partition wall, and the substrate. It was also confirmed that the sealing film was bonded to the partition wall without being peeled off.

EXAMPLE 6

An electric display device was prepared in the same manner as in Example 1 except that the sealing film precursor was changed to polytetramethylene ether glycol=di (2-maleimide acetate) (trade name: "MIA200"; specific gravity: not less than 1; mfd. by Dainippon Ink And Chemicals, Inc.) and that Irgacure 184 was not added in the sealing film precursor. The compound is not soluble in Isoper H and has a specific gravity larger than Isoper H. The reason why Irgacure 184 was not added in the sealing film precursor is because the compound (MIA 200) can be polymerized without using the photopolymerization initiator.

When the resultant display device was driven similarly as in Example 1, the same display state change as in Example 1 was observed. Even when a continuous drive of the display device was performed, no phenomenon that the electrophoretic particles 50 were displaced so as to flow over the partition wall 20 was observed. Further, the sealing film 30 was not peeled from the partition wall side.

EXAMPLE 7

An electric display device was prepared in the same manner as in Example 1 except that the sealing film precursor was changed to a mixture of 80 wt. parts of polytetramethylene ether glycol=di(2-maleimide acetate) (trade name: "MIA200"; specific gravity: not less than 1; mfd. by Dainippon Ink And Chemicals, Inc.) and 20 wt. parts of 1H,1H,5H-octafluoropentyl acrylate (trade name: "V-8F" specific gravity: not less than 1 mfd. by Osaka Yuki Kagaku Kogyo K.K.) and that Irgacure 184 was not added in the sealing film precursor. The mixture is not soluble in Isoper H and has a specific gravity larger than Isoper H. The reason why Irgacure 184 was not added in the sealing film precursor is because the compound (MIA 200) can be polymerized without using the photopolymerization initiator.

When the resultant display device was driven similarly as in Example 1, the same display state change as in Example 1 was observed. Even when a continuous drive of the display device was performed, no phenomenon that the electrophoretic particles 50 were displaced so as to flow over the partition wall 20 was observed. Further, the sealing film 30 was not peeled from the partition wall side.

EXAMPLE 8

An electric display device was prepared in the same manner as in Example 1 except that the sealing film precursor was changed to a mixture of 50 wt. parts of 1H,1H, 2H,2H-heptadecafluorodecyl acetate (trade name: "V-17F"; specific gravity: not less than 1; mfd. by Osaka Yuki Kagaku Kogyo K.K.) and 15 wt. parts of 1H,1H,5H-octafluoropentyl acrylate (trade name: "V-8F" specific gravity: not less than 1 mfd. by Osaka Yuki Kagaku Kogyo K.K.) and that Irgacure 184 was changed to "MIA200". The mixture is not soluble in Isoper H and has a specific gravity larger than Isoper H. The photopolymerization initiator (MIA200) is a component constituting the sealing film after the polymerization.

When the resultant display device was driven similarly as in Example 1, the same display state change as in Example 1 was observed. Even when a continuous drive of the display device was performed, no phenomenon that the electrophoretic particles 50 were displaced so as to flow over the partition wall 20 was observed. Further, the sealing film 30 was not peeled from the partition wall side.

EXAMPLE 9

An electric display device as shown in FIG. 12 was prepared.

The resultant display device has 200×600 pixels each has a size of 240 μm×80 μm. Each pixel is surrounded by a partition wall 20 having a width of 8 μm and a height of 28 μm. A first electrode 60 is located between the adjacent partition walls 20 and is connected to a switching device 80. A second electrode 70 is located between the partition wall 20 and a substrate 10. The second electrode 70 is an electrode which is common to all the pixels.

A specific production process of the display device in this embodiment will be described with reference to FIGS. 19–21, 24 and 26.

Referring to FIG. 19, on a 0.1 mm-thick stainless steel substrate 10, a switching device 80 was formed. Then the substrate was coated with an insulating layer of acrylic resin, and the insulating layer was provided with a contact hole. Thereafter, on the insulating layer, a resist pattern for scattering incident light was formed and thereon, a first electrode 60 of aluminum was formed and electrically connected with the switching device 80 disposed on the substrate 10 through the contact hole. The first electrode 60 was covered with an acrylic resin layer containing titanium oxide fine particles. The first electrode 60 in this example also functioned as a light reflection/scattering layer. On the acrylic resin layer, a second electrode 70 of dark black titanium carbide and a partition wall 20 of a pured product of a photoresist ("SU-8", mfd. by 3M) were formed in thick film by a known photolithographic process.

Separately, onto a PET substrate, 1,4-butanediol diglycidyl ether diacrylate (trade name: "NK oligo EA-5520"; specific gravity: not less than 1 mfd. by Shin Nakamura Kagaku Kogyo K.K.) being a UV polymerizable compound, into which 5 wt. % of a photopolymerization initiator ("Irgacure 184", mfd. by Ciba-Gaigy, Ltd.) was added, was spin-coated. The resultant coating layer of polymerizable compound had a thickness of 7 μm.

The PET substrate 180 provided with the polymerizable compound coating layer 190 was caused to contact the upper end portion of the partition wall 20 as shown in FIG. 20. The PET substrate 180 was removed (peeled) from the partition wall upper end portion after the contact. As a result, it was possible to dispose the polymerizable compound at the upper end portion of the partition wall. In other words, it was possible to transfer the polymerizable compound from the PET substrate onto the partition wall upper end portion. One of the reasons why the transfer is realized is because the polymerizable compound (EA-5520) has a good affinity to the partition wall. FIG. 21 schematically illustrates a state after the transfer, wherein a reference numeral 200 represents the transferred layer of the polymerizable compound as the above described bonding film precursor.

After the transfer, a dispersion liquid comprising a dispersion medium 40 and electrophoretic particles 50 was filled at each pixel (FIG. 10). As the dispersion medium 40, isoparaffin (trade name: "Isoper H"; specific gravity: 0.76; mfd. by Exxon Corp.) was used. As the electrophoretic compounds 50, particles (average particle size: 1–2 $\mu$m) of a styrene-methyl methacrylate copolymer resin containing carbon black were used. In the isoparaffin, succinimide (trade name: "OLOA1200", mfd. by Shevron Corp.) was added as a charge control agent.

On the other hand, by a PET substrate as a supporting member 130, a layer 120 of sealing film precursor to be disposed on the dispersion medium was supported (FIG. 24). As the sealing film precursor, 1,4-butanediol diglycidyl ether diacrylate (trade name: "NK oligo EA-5520"; specific gravity: not less than 1; mfd. by Shin Nakamura Kagaku Kogyo K.K.) being a UV curable monomer was used. This acrylate monomer and Isoper H (as the dispersion medium) are not soluble in each other and the acrylate monomer has a specific gravity larger than that of Isoper H.

The sealing film precursor layer 120 was formed in a thickness of 7 $\mu$m by spin-coating the acrylate monomer mixed with 5 wt. % of a photopolymerization initiator ("Irgacure 184", available from Ciba-Gaigy, Ltd.) on the above-prepared supporting member 130.

Thereafter, the supporting member 130 was placed on the partition wall 20 and the dispersion medium 40 so that the sealing film precursor layer 120 contacted the partition wall 20 and the dispersion medium 40. After the lapse of several seconds from the contact, the sealing film precursor layer 120 pushed the dispersion liquid away to contact the partition wall 20, whereby a state in which the sealing film precursor layer 120 covered the upper end portion of the partition wall 20 and the exposed (outer) surface of the dispersion liquid was finally created (FIG. 24).

After such a state was created, the resultant structure was subjected to UV irradiation for 5 minutes at an intensity of 0.3 mW/cm at room temperature to effect polymerization of the sealing film precursor and the bonding film precursor. As a result, a cured sealing film 30 a cured bonding film 90 were formed (FIG. 26).

After the polymerization, when the resultant display device was viewed from the side closer to the sealing film 30, the electrophoretic particles 50 were not observed at the upper end portion of the partition wall 20 and within the sealing film 30. In other words, during the polymerization process, the electrophoretic particles 50 were not incorporated into the sealing film 30.

Then, drive of the display device of this example was effected by alternately modulating an electric potential of the second electrode between +15 V and −15 V at a frequency of 1 Hz while grounding the first electrode. As a result, in synchronism with the alternating potential modulation, a resultant display state was alternately changed between a black state and a white state.

Even when such a drive of the display device was continued, a phenomenon that the electrophoretic particles 50 were displaced so as to flow over the partition wall 20 was not observed. In other words, it was confirmed that the dispersion liquid was confined by the sealing film, the partition wall, and the substrate. It was also confirmed that the sealing film was bonded to the partition wall without being peeled off.

EXAMPLE 10

An electric display device was prepared in the same manner as in Example 9 except that the supporting member 130 was removed from the sealing film 30 so as to expose the sealing film 30 to ambient air.

When the display device was driven similarly as in Example 9, the display device exhibited the same display state change as in Example 9. At the time of driving the display device, no phenomenon that the electrophoretic particles 50 were displaced so as to flow over the partition wall 20 was observed. Further, peeling-off of the sealing film 30 from the partition wall 20 side and volatilization of the dispersion medium 40 were also not observed, so that it was confirmed that the sealing film 30 and the partition wall 20 were bonded to each other.

Then, although the display device was bent backward and forward, such a phenomenon that the electrophoretic particles 50 were displaced so as to flow over the partition wall was not observed. Further, evaluation of the drive of the display device was performed in the same manner as in Example 9 in such a state that the display device was curved or inflected. As a result, the same display state change as in Example 9 was observed. Further, it was confirmed that the sealing film was bonded to the partition wall without being peeled from the partition wall.

EXAMPLE 11

An electric display device was prepared in the same manner as in Example 9 except that the sealing film precursor was changed to polyethylene glycol methacrylate (trade name: "PE200"; specific gravity: not less than 1; mfd. by Nippon Yushi K.K.). The methacrylate is not soluble in Isoper H and has a specific gravity larger than Isoper H.

When the resultant display device was driven similarly as in Example 9, the same display state change as in Example 9 was observed. Even when a continuous drive of the display device was performed, no phenomenon that the electrophoretic particles 50 were displaced so as to flow over the partition wall 20 was observed. Further, the sealing film 30 was not peeled from the partition wall side.

EXAMPLE 12

An electric display device was prepared in the following manner.

Similar steps as in Example 9 were repeated up to formation of the partition wall 20.

Then, a 1%-solution of a polymerizable compound (EA-5520), identical to that used in Example 9 in ethanol containing 5 wt. % of a photopolymerization initiator ("Irgacure 184", mfd. by Ciba-Geigy, Ltd.) on the basis of the polymerizable compound was spin-coated onto the substrate provided with the partition wall. The spin coating was performed so that the entire surface of the partition wall 20 was coated with the solution of the polymerizable compound (EA-5520) to form a layer 200 of bonding film precursor as shown in FIG. 22. The resultant structure was subjected to irradiation with UV light for 15 seconds at an intensity of 0.3 mW/cm$^2$ at room temperature. In the UV irradiation conditions, only a part of the coated polymerizable compound (EA-5520) was polymerized.

Thereafter, a dispersion liquid comprising a dispersion medium 40 and electrophoretic particles 50 was filled at each pixel (FIG. 10). As the dispersion medium 40, isoparaffin (trade name: "Isoper H"; specific gravity. 0.76; mfd by Exxon Corp.) was used. As the electrophoretic compounds 50, particles (average particle size: 1–2 µm) of a styrene-methyl methacrylate copolymer resin containing carbon black were used. In the isoparaffin, succinimide (trade name: "OLOA1200", mfd. by Shevron Corp.) was added as a charge control agent.

Thereafter, the sealing film precursor layer formed on the supporting member 130 was disposed on the dispersion medium in the same manner as in Example 9. After the lapse of several seconds from the contact, the sealing film precursor layer 120 pushed the dispersion liquid away to contact the partition wall 20, whereby a state in which the sealing film precursor layer 120 covered at least the upper end portion of the partition wall 20 and the exposed (outer) surface of the dispersion liquid was finally created (FIG. 24).

After such a state was created, the resultant structure was subjected to UV irradiation for 5 minutes at an intensity of 0.3 mW/cm at room temperature to effect polymerization of the sealing film precursor and the bonding film precursor. As a result, a cured sealing film 30 a cured bonding film 200 were formed.

After the polymerization, when the resultant display device was viewed from the side closer to the sealing film 30, the electrophoretic particles 50 were not observed at the upper end portion of the partition wall 20 and within the sealing film 30. In other words, during the polymerization process, the electrophoretic particles 50 were not incorporated into the sealing film 30.

Then, drive of the display device of this example was effected by alternately modulating an electric potential of the second electrode between +15 V and −15 V at a frequency of 1 Hz while grounding the first electrode. As a result, in synchronism with the alternating potential modulation, a resultant display state was alternately changed between a black state and a white state.

Even when such a drive of the display device was continued, a phenomenon that the electrophoretic particles 50 were displaced so as to flow over the partition wall 20 was not observed. In other words, it was confirmed that the dispersion liquid was confined by the sealing film, the partition wall, and the substrate. It was also confirmed that the sealing film was bonded to the partition wall without being peeled off.

EXAMPLE 13

An electric display device was prepared in the same manner as in Example 9 except that the supporting member 130 was removed from the sealing film 30 so as to expose the sealing film 30 to ambient air.

When the display device was driven similarly as in Example 12, the display device exhibited the same display state change as in Example 12. At the time of driving the display device, no phenomenon that the electrophoretic particles 50 were displaced so as to flow over the partition wall 20 was observed. Further, peeling-off of the sealing film 30 from the partition wall 20 side and volatilization of the dispersion medium 40 were also not observed, so that it was confirmed that the sealing film 30 and the partition wall 20 were bonded to each other.

Then, although the display device was bent backward and forward, such a phenomenon that the electrophoretic particles 50 were displaced so as to flow over the partition wall was not observed. Further, evaluation of the drive of the display device was performed in the same manner as in Example 9 in such a state that the display device was curved or inflected. As a result, the same display state change as in Example 9 was observed. Further, it was confirmed that the sealing film was bonded to the partition wall without being peeled from the partition wall.

EXAMPLE 14

An electric display device was prepared in the same manner as in Example 9 except that the material for the partition wall 20 was changed to the polymerizable compound (EA-5520) identical to that used also for the sealing film precursor layer.

When the resultant display device was driven similarly as in Example 9, the same display state change as in Example 9 was observed. Even when a continuous drive of the display device was performed, no phenomenon that the electrophoretic particles 50 were displaced so as to flow over the partition wall 20 was observed. Further, the sealing film 30 was not peeled from the partition wall side.

EXAMPLE 15

An electric display device was prepared in the following manner.

Similar steps as in Example 9 were repeated up to filling of the dispersion liquid comprising the electrophoretic particles, the dispersion medium, and the charge control agent between the partition wall 20.

Then, a 1%-solution of a polymerizable compound (EA-5520) in chloroform containing 5 wt. % of a photopolymerization initiator ("Irgacure 184", mfd. by Ciba-Geigy, Ltd.) on the basis of the polymerizable compound was minutely sprayed onto the dispersion liquid.

Figure 27:
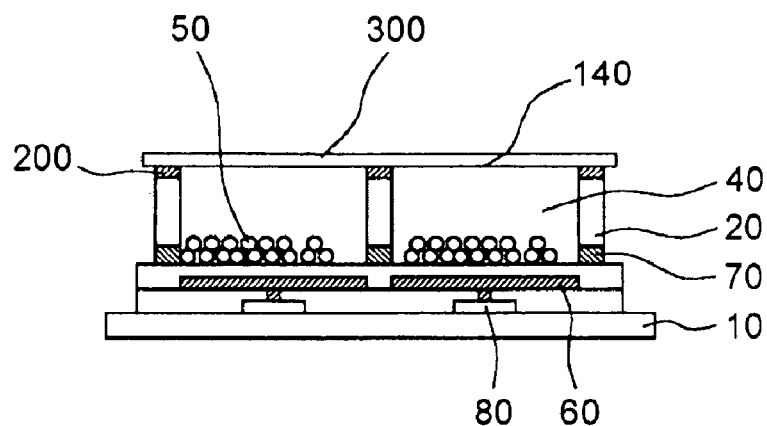
Figure 28:
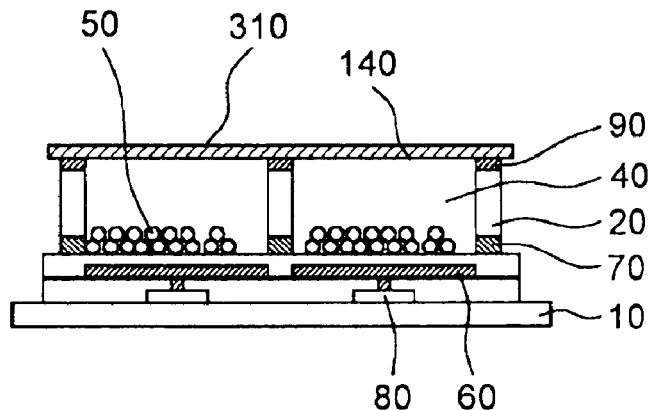

In the minute spraying operation, when the chloroform solution was attached to the dispersion liquid, chloroform volatilized immediately, so that a thin film 300 of the polymerizable compound (EA-5520) was formed at an exposed surface 140 of the dispersion liquid (FIG. 27). This is presumably because the polymerizable compound (EA-5520) is not soluble in the dispersion liquid and has a molecular structure containing —O— and —OH, thus exhibiting a behavior like a certain type of a surfactant. In such a state, the dispersion liquid surface was subjected to irradiation with UV light for 5 minutes at an intensity of 0.3 mW/cm² at room temperature. When the resultant structure was observed through a microscope, the dispersion medium 40 and the electrophoretic particles 50 were defined by a transparent film 310 and the partition wall 20 as shown in FIG. 28.

Then, a polymerizable compound (EA-5520) in chloroform containing 5 wt. % of a photopolymerization initiator ("Irgacure 184", mfd. by Ciba-Geigy, Ltd.) was applied onto the thin film 310.

In such a state, the surface of the polymerizable compound layer was subjected to irradiation with UV light for 5 minutes at an intensity of 0.3 mW/cm² at room temperature to form a polymer layer of the polymerizable compound, bonded to the thin film 310, as a sealing film.

On the sealing film, a 5 µm-thick polycarbonate film was laminated, followed by UV light irradiation for 6 minutes at an intensity of 0.3 mW/cm² at room temperature. As a result, polymerization of a polymerizable component remaining on the outer surface side of the sealing film remaining on the outer surface side of the sealing film proceeded, and at the same time, the polycarbonate film is bonded to the sealing film, thus providing a tough sealed structure.

After the polymerization, when the resultant display device was viewed from the side closer to the sealing film 30, the electrophoretic particles 50 were not observed at the upper end portion of the partition wall 20 and within the sealing film. In other words, during the polymerization process, the electrophoretic particles 50 were not incorporated into the sealing film.

Then, drive of the display device of this example was effected by alternately modulating an electric potential of the second electrode between +15 V and −15 V at a frequency of 1 Hz while grounding the first electrode. As a result, in synchronism with the alternating potential modulation, a resultant display state was alternately changed between a black state and a white state.

Even when such a drive of the display device was continued, a phenomenon that the electrophoretic particles 50 were displaced so as to flow over the partition wall 20 was not observed. In other words, it was confirmed that the dispersion liquid was confined by the sealing film, the partition wall, and the substrate. It was also confirmed that the sealing film was bonded to the partition wall without being peeled off.

EXAMPLE 16

Figure 29:
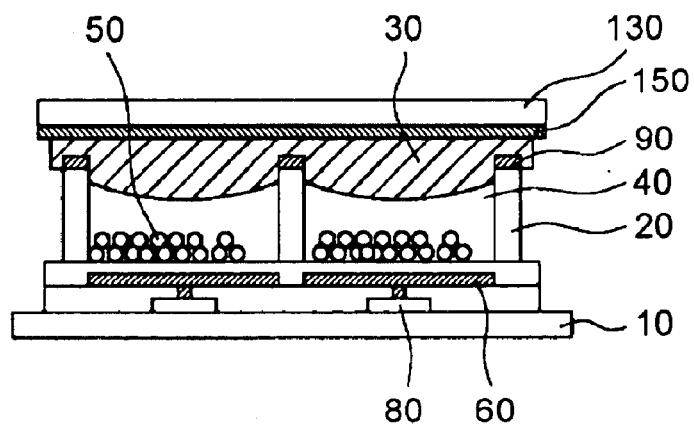
FIG. 29 is a schematic sectional view illustrating another embodiment of an electric display device produced through the process of the present invention.

An electric display device as shown in FIG. 29 was prepared.

The resultant display device has 200×600 pixels each has a size of 240 μm×80 μm. Each pixel is surrounded by a partition wall 20 having a width of 8 μm and a height of 28 μm. A first electrode 60 is located between adjacent the partition walls 20 and is connected to a switching device 80. A second electrode 150 is disposed on a supporting member 130 for supporting a sealing film 30. The second electrode 150 is an electrode which is common to all the pixels.

Similar steps as in Example 9 were repeated up to formation of the partition wall 20.

Separately, onto a PET substrate, polytetramethylene ether glycol=di(2-maleimide acetate (trade name: "MIA-200"; specific gravity: not less than 1; mfd. by Dainippon Ink And Chemicals Inc.) was added, was spin-coated. The resultant coating layer of polymerizable compound had a thickness of 7 μm.

The PET substrate provided with the polymerizable compound coating layer was caused to contact the upper end portion of the partition wall 20. The PET substrate was removed (peeled) from the partition wall upper end portion after the contact. As a result, it was possible to dispose the polymerizable compound at the upper end portion of the partition wall. In other words, it was possible to transfer the polymerizable compound from the PET substrate onto the partition wall upper end portion. One of the reasons why the transfer is realized is because the polymerizable compound (MIA200) has a good affinity to the partition wall.

After the transfer, a dispersion liquid comprising a dispersion medium 40 and electrophoretic particles 50 was filled at each pixel (FIG. 10). As the dispersion medium 40, isoparaffin (trade name: "Isoper H"; specific gravity: 0.76; mfd. by Exxon Corp.) was used. As the electrophoretic compounds 50, particles (average particle size: 1–2 μm) of a white titanium oxide were used. In the isoparaffin, succinimide (trade name: "OLOA1200", mfd. by Shevron Corp.) as a charge control agent and blue dye were added.

On the other hand, on a PET substrate as a supporting member 130 provided with an ITO electrode layer as the second electrode 150, a layer 120 of sealing film precursor to was formed. As the sealing film precursor, 1,4-butanediol diglycidyl ether diacrylate (trade name: "NK oligo EA-5520"; specific gravity: not less than 1; mfd. by Shin Nakamura Kagaku Kogyo K.K.) being a UV curable monomer was used. This acrylate monomer and Isoper H (as the dispersion medium) are not soluble in each other and the acrylate monomer has a specific gravity larger than that of Isoper H.

The sealing film precursor layer 120 was formed in a thickness of 7 μm by spin-coating the acrylate monomer mixed with 5 wt. % of a photopolymerization initiator ("Irgacure 184", available from Ciba-Gaigy, Ltd.) on the above-prepared supporting member 130 (provided with the second electrode 150).

Thereafter, the supporting member 130 was placed on the partition wall 20 and the dispersion medium 40 so that the sealing film precursor layer 120 contacted the partition wall 20 and the dispersion medium 40. AFter the lapse of several seconds from the contact, the sealing film precursor layer 120 pushed the dispersion liquid away to contact the partition wall 20, whereby a state in which the sealing film precursor layer 120 covered at least the upper end portion of the partition wall 20 and the exposed (outer) surface of the dispersion liquid was finally created.

After such a state was created, the resultant structure was subjected to UV irradiation for 5 minutes at an intensity of 0.3 mW/cm at room temperature to effect polymerization of the sealing film precursor and the bonding film precursor. As a result, a cured sealing film 30 a cured bonding film 90 were formed (FIG. 29).

After the polymerization, when the resultant display device was viewed from the side closer to the sealing film 30, the electrophoretic particles 50 were not observed at the upper end portion of the partition wall 20 and within the sealing film 30. In other words, during the polymerization process, the electrophoretic particles 50 were not incorporated into the sealing film 30.

Then, drive of the display device of this example was effected by alternately modulating an electric potential of the second electrode between +15 V and −15 V at a frequency of 1 Hz while grounding the first electrode. As a result, in synchronism with the alternating potential modulation, a resultant display state was alternately changed between a white state and a blue state.

Even when such a drive of the display device was continued, a phenomenon that the electrophoretic particles 50 were displaced so as to flow over the partition wall 20 was not observed. In other words, it was confirmed that the dispersion liquid was confined by the sealing film, the partition wall, and the substrate. It was also confirmed that the sealing film was bonded to the partition wall without being peeled off.

EXAMPLE 17

An electric display device was prepared in the same manner as in Example 1 except that the bonding film precursor was changed to β-acryloyloxyethylhydrogen succinate (trade name: "NK ester A-SA"; specific gravity: not less than 1; mfd. by Shin Nakamura Kagaku Kogyo K.K.). The compound is not soluble in Isoper H.

When the resultant display device was driven similarly as in Example 9, the same display state change as in Example 9 was observed. Even when a continuous drive of the display device was performed, no phenomenon that the electrophoretic particles 50 were displaced so as to flow over the partition wall 20 was observed. Further, the sealing film 30 was not peeled from the partition wall side.

EXAMPLE 18

An electric display device was prepared in the same manner as in Example 9 except that the bonding film precursor was changed to polytetramethylene ether glycol=di(2-maleimide acetate) (trade name: "MIA200"; specific gravity: not less than 1; mfd. by Dainippon Ink And Chemicals, Inc.). The compound is not soluble in Isoper H.

When the resultant display device was driven similarly as in Example 9, the same display state change as in Example 9 was observed. Even when a continuous drive of the display device was performed, no phenomenon that the electrophoretic particles 50 were displaced so as to flow over the partition wall 20 was observed. Further, the sealing film 30 was not peeled from the partition wall side.

EXAMPLE 19

An electric display device was prepared in the same manner as in Example 10 except that the sealing film precursor was changed to polytetramethylene ether glycol=di(2-maleimide acetate) (trade name: "MIA200"; specific gravity: not less than 1; mfd. by Dainippon Ink And Chemicals, Inc.) and that Irgacure 184 was not added in the sealing film precursor. The compound is not soluble in Isoper H and has a specific gravity larger than Isoper H.

When the resultant display device was driven similarly as in Example 18, the same display state change as in Example 18 was observed. Even when a continuous drive of the display device was performed, no phenomenon that the electrophoretic particles 50 were displaced so as to flow over the partition wall 20 was observed. Further, the sealing film 30 was not peeled from the partition wall side.

EXAMPLE 20

An electric display device was prepared in the same manner as in Example 18 except that the sealing film precursor was changed to polytetramethylene ether glycol=di(2-maleimide acetate) (trade name: "MIA200"; specific gravity: not less than 1; mfd. by Dainippon Ink And Chemicals, Inc.) and 20 wt. parts of 1H,1H,5H-octafluoropentyl acrylate (trade name: "V-8F"; specific gravity: not less than 1; mfd. by Osaka Yuki Kagaku Kogyo K.K.). The mixture is not soluble in Isoper H and has a specific gravity larger than Isoper H.

When the resultant display device was driven similarly as in Example 18, the same display state change as in Example 18 was observed. Even when a continuous drive of the display device was performed, no phenomenon that the electrophoretic particles 50 were displaced so as to flow over the partition wall 20 was observed. Further, the sealing film 30 was not peeled from the partition wall side.

EXAMPLE 21

An electric display device was prepared in the same manner as in Example 18 except that the sealing film precursor was changed to a mixture of 85 wt. parts of 1H,1H,2H,2H-heptadecafluorodeyl acrylate) (trade name: "V-17V"; specific gravity: not less than 1; mfd. by Osaka Yuki Kagaku Kogyo K.K.) and 15 wt. parts of 1H,1H,5H-octafluoropentyl acrylate (trade name: "V-8F"specific gravity: not less than 1 mfd. by Osaka Yuki Kagaku Kogyo K.K). The mixture is not soluble in Isoper H and has a specific gravity larger than Isoper H.

When the resultant display device was driven similarly as in Example 18, the same display state change as in Example 18 was observed. Even when a continuous drive of the display device was performed, no phenomenon that the electrophoretic particles 50 were displaced so as to flow over the partition wall 20 was observed. Further, the sealing film 30 was not peeled from the partition wall side.

EXAMPLE 22

An electric display device was prepared in the same manner as in Example 15 except that polytetramethylene ether glycol-di(2-maleimide acetate) (trade name: "MIA200"; specific gravity: not less than 1; mfd. by Dainippon Ink And Chemicals, Inc.) as the material for the thin film 300 and the polymerizable compound for the sealing film precursor, that the photopolymerization initiator (Irgacure 184) was not added in MIA 200, and that the polycarbonate film was not laminated on the sealing film.

When the resultant display device was driven similarly as in Example 15, the same display state change as in Example 15 was observed. Even when a continuous drive of the display device was performed, no phenomenon that the electrophoretic particles 50 were displaced so as to flow over the partition wall 20 was observed. Further, the sealing film 30 was not peeled from the partition wall side.

As described hereinabove, according to the processes of the present invention, it is possible to provide an electric display device including inexpensive and flexible sealing film irrespective of the specific gravity of the polymerizable compound. Further, it is also possible to ensure a good adhesive properties between the sealing film and the partition wall.

While the invention has been described with reference to the specific examples disclosed herein, it is not confined to the details set forth and this application is intended to cover such modifications or changes as may come within the purposes of the improvements or the scope of the following claims.

What is claimed is:

1. A process for producing an electric display device of the type wherein a dispersion liquid comprising at least a dispersion medium and electrophoretic particles is disposed in a space defined by a substrate, a partition wall disposed on the substrate, and a sealing film disposed on an upper end portion of the partition wall, said process comprising:

a step of disposing a sealing film precursor, comprising a polymerizable compound, supported by a supporting member on both an exposed surface of the dispersion liquid and at least a part of the upper end portion of the partition wall in a state that the dispersion liquid is filled between adjacent partition walls, and a step of polymerizing the polymerizable compound to form the sealing film.

2. A process according to claim 1, wherein the supporting member has a surface which has an affinity to the sealing film precursor.

3. A process according to claim 1, wherein the dispersion liquid and the sealing film precursor are insoluble in each other.

4. A process according to claim 1, wherein the polymerizable compound is a photopolymerizable compound.

5. A process according to claim 4, wherein the photopolymerizable compound comprises a photopolymerizable monomer or oligomer.

6. A process according to claim 5, wherein the photopolymerizable monomer is 1,4-butanedioldiglycidyl ether diacrylate.

7. A process according to claim 5, wherein the photopolymerizable oligomer is polytetramethylene ether glycol=di(2-maleimide acetate).

8. A process according to claim 5, wherein the photopolymerizable monomer or oligomer comprises at least two species of monomers or oligomers.

9. A process according to claim 8, wherein one of said at least two species of monomers or oligomers is a fluorine-containing acrylate.

10. A process according to claim 8, wherein one of said at least two species of monomers or oligomers is polytetramethylene ether glycol=di(2-maleimide acetate).

11. A process according to claim 1, wherein the supporting member is removed from the sealing film after completion of the polymerization.

12. A process according to claim 11, wherein on the sealing film, another film is disposed after the supporting member is removed.

13. A process according to claim 1, wherein the supporting member and the sealing film are transparent.

14. A process for producing an electric display device of the type wherein a dispersion liquid comprising at least a dispersion medium and electrophoretic particles is disposed in a space defined by a substrate, a partition wall disposed on the substrate, and provided with a bonding film at an upper end portion thereof and a sealing film disposed on the upper end portion of the partition wall, said process comprising:

a step of disposing a bonding film precursor, comprising a polymerizable compound, on the upper end portion of the partition wall, a step of disposing a sealing film precursor, comprising a polymerizable compound, on both an exposed surface of the dispersion liquid and at least the surface of the bonding film at the upper end portion of the partition wall, and a step of polymerizing the polymerizable compound in a state that the bonding film precursor contacts the sealing film precursor to integrally form the sealing film and the bonding film.

15. A process according to claim 14, wherein the polymerizable compound has at least one group selected from the group consisting of —O—, —CH$_2$—O—, —OH—, and —CF$_2$—.

16. A process according to claim 14, wherein the polymerizable compound has a polyethylene glycol structure.

17. A process according to claim 14, wherein the polymerizable compound is ai photopolymerizable compound.

18. A process according to claim 14, wherein the photopolymerizable monomer is 1,4-butanedioldiglycidyl ether diacrylate.

19. A process according to claim 15, wherein the partition wall comprises a polymer of the polymerizable compound.

* * * * *